United States Patent
Hirashima et al.

(10) Patent No.: US 9,438,846 B2
(45) Date of Patent: Sep. 6, 2016

(54) TELEVISION RECEIVER AND ELECTRONIC DEVICE

(71) Applicant: Kabushiki Kaisha Toshiba, Tokyo (JP)

(72) Inventors: Masaya Hirashima, Tokyo (JP); Tsuyoshi Kozai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 917 days.

(21) Appl. No.: 13/692,792

(22) Filed: Dec. 3, 2012

(65) Prior Publication Data

US 2013/0169891 A1    Jul. 4, 2013

(30) Foreign Application Priority Data

Dec. 28, 2011    (JP) ................................ 2011-289630

(51) Int. Cl.
| | |
|---|---|
| *H04N 5/64* | (2006.01) |
| *H01R 12/70* | (2011.01) |
| *H01R 12/72* | (2011.01) |
| *H01R 27/02* | (2006.01) |

(52) U.S. Cl.
CPC ............ *H04N 5/64* (2013.01); *H01R 12/7076* (2013.01); *H01R 12/724* (2013.01); *H01R 27/02* (2013.01)

(58) Field of Classification Search
CPC ........... H04N 5/64; H04N 5/655; G06F 1/16
USPC ........................................................ 348/836
See application file for complete search history.

(56) References Cited

U.S. PATENT DOCUMENTS

| | | | |
|---|---|---|---|
| 7,850,477 B2 | 12/2010 | Koyama et al. | |
| 8,653,848 B2 | 2/2014 | Kozai et al. | |
| 2012/0250269 A1* | 10/2012 | Happoya ................ | H05K 1/118 361/749 |

FOREIGN PATENT DOCUMENTS

| | | |
|---|---|---|
| JP | 08-028255 A | 1/1996 |
| JP | 3042426 B | 3/2000 |
| JP | 2001-135896 A | 5/2001 |

(Continued)

OTHER PUBLICATIONS

Notice of Rejection mailed by Japan Patent Office on Mar. 5, 2013 in the corresponding Japanese patent application No. 2011-289630—5 pages.

(Continued)

*Primary Examiner* — Thai Tran
*Assistant Examiner* — Mishawn Hunter
(74) *Attorney, Agent, or Firm* — Knobbe, Martens, Olson & Bear LLP

(57) ABSTRACT

According to one embodiment, a television receiver includes: housing; display; circuit board; and connector. The connector is electrically connected to the circuit board, and connected with an external connector. The connector includes: an insulating member; terminal members; and a container. The insulating member includes: a base portion; and an insertion portion extending from the base portion toward the second opening and inserted into a connection portion of the external connector. The terminal members are provided to the insertion portion, and coupled to the connection portion. The container is configured to house the insertion portion. The insertion portion includes: a side surface; and a slanted surface provided to at least one of ends of the side surface at the base portion side and the other one of the ends of the side surface. The slanted surface is slanted with respect to the side surface.

14 Claims, 24 Drawing Sheets

(56) References Cited

FOREIGN PATENT DOCUMENTS

| | | |
|---|---|---|
| JP | 3141351 U | 5/2008 |
| JP | 3151673 U | 7/2009 |
| JP | 2009-277497 A | 11/2009 |
| JP | 2011-250220 A | 12/2011 |

OTHER PUBLICATIONS

Decision to Grant a Patent issued by Japan Patent Office on May 28, 2013 in the corresponding Japanese patent application No. 2011-289630—5 pages.

* cited by examiner

TELEVISION RECEIVER AND ELECTRONIC DEVICE

CROSS-REFERENCE TO RELATED APPLICATIONS

This application is based upon and claims the benefit of priority from Japanese Patent Application No. 2011-289630, filed on Dec. 28, 2011, the entire contents of which are incorporated herein by reference.

FIELD

Embodiments described herein relate generally to a television receiver and an electronic device.

BACKGROUND

Conventionally known is a television receiver or an electronic device comprising a connector to which an external connector is connected.

There has been desired to prevent a connector on a television receiver or an electronic device from being damaged.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
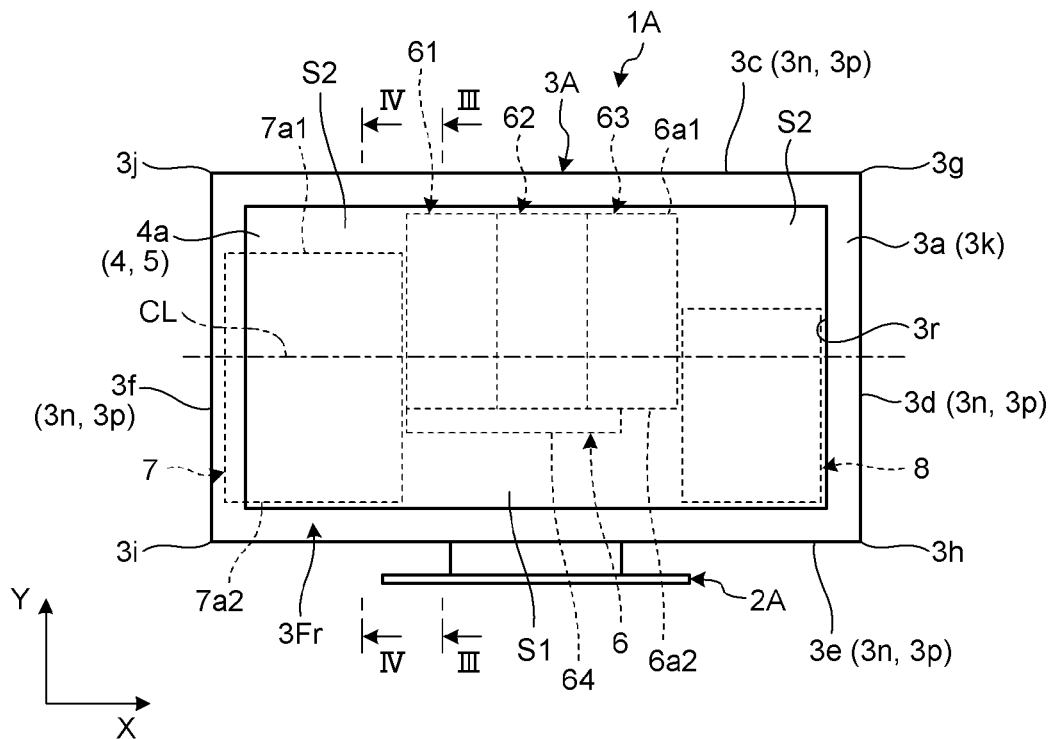
FIG. 1 is an exemplary front view of a television receiver according to a first embodiment.

In general, according to one embodiment, a television receiver comprises: a housing; a display; a circuit board; and a connector. The housing comprises a first opening and a second opening. The display comprises a rear surface and a display surface exposed through the first opening. The display is housed in the housing. The circuit board is on the rear surface side of the display, and in the housing. The connector is in the housing, exposed through the second opening, configured to be coupled to the circuit board, and configured to be connected with an external connector. The connector comprises: an insulating member; a plurality of terminal members; and a container. The insulating member comprises: a base portion; and an insertion portion extending from the base portion toward the second opening and configured to be inserted into a connection portion of the external connector. The terminal members are configured to be provided to the insertion portion, and to be coupled to the connection portion. The container is configured to house the insertion portion, and comprises one end at which the external connector is inserted. The insertion portion comprises: a side surface; and a slanted surface provided to at least one of ends of the side surface at the base portion side and the other one of the ends of the side surface. The slanted surface is slanted with respect to the side surface.

In exemplary embodiments described below, common elements are comprised. Therefore, in explanations below, the same reference numerals are assigned to the same elements, and redundant explanations thereof are partially omitted. In addition, in each of the drawings, directions (an X direction, a Y direction, and a Z direction) are illustrated for convenience. The X direction corresponds to the longitudinal direction of a display surface 4a of in a front view. The Y direction corresponds to the short side direction of the display surface 4a in the front view. The Z direction corresponds to the front-back direction of the display surface 4a (depth direction, the thickness direction of a housing 3A) in the front view. The X direction, the Y direction, and the Z direction perpendicularly intersect each other.

In the embodiments described below, explained as an example is an electronic device configured as a television receiver, a personal computer, or a magnetic disk device, but the electronic device according to the embodiments is not limited thereto. For example, the electronic device according to the embodiments may be various electronic devices such as a smartphone, a smartbook, a cellular phone, a personal digital assistant (PDA), a video display device, and a video phone.

Figure 2:
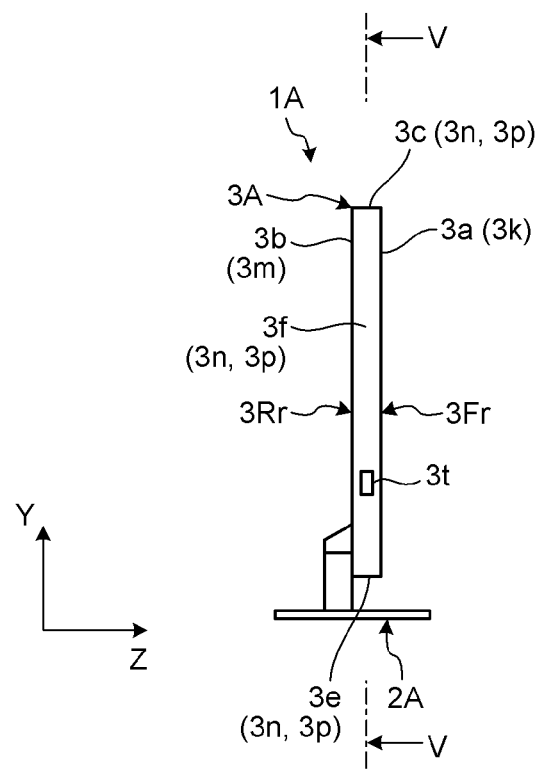
FIG. 2 is an exemplary side view of the television receiver in the first embodiment.

A television receiver 1A that is an example of an electronic device according to a first embodiment comprises a support 2A (a supporting portion, a station, a stand) and the housing 3A, as illustrated in FIGS. 1 and 2. Specifically, the support 2A is placed on a setting area such as a desk, a shelf, and a table (a setting surface not illustrated), and supports the housing 3A at an upright position. To support the housing 3A, the support 2A may be fixed to the housing 3A, or may be movable (rotatable, slidable) with respect to the housing 3A. The support 2A of the housing 3A may be moved (rotated) by being tilted, swiveled, or pivoted, for example.

In the first embodiment, as an example, as may be understood from FIG. 1, the housing 3A has an external appearance of a rectangular shape (in the first embodiment, an oblong shape, as an example) in the front view (and the rear view). The housing 3A is also a cuboid shape that is thin and flat in the front-back direction (the thickness direction of the housing 3A, the Z direction), as illustrated in FIG. 2. The housing 3A comprises a front surface 3a (a frontal surface, a surface, a surface portion) and a rear surface 3b (aback surface, a surface, a surface portion) opposite the front surface 3a. The front surface 3a and the rear surface 3b are laid approximately in parallel (in the first embodiment, in parallel, as an example). The housing 3A also comprises four ends 3c to 3f (sides, edge portions) and four corners 3g to 3j (pointed portions, curved portions, ends) in the front view, as illustrated in FIG. 1. The ends 3c and 3e are examples of longer sides. The ends 3d and 3f are examples of shorter sides.

The housing 3A comprises a wall 3k (a portion, a plate, a frame, a front wall, a frontal wall, a top wall) including the front surface 3a, and a wall 3m (a portion, a plate, a rear wall, a back wall, a bottom wall, a second wall) including the rear surface 3b. Each of the walls 3k and 3m has a rectangular shape (in the first embodiment, an oblong shape, as an example). The wall 3k also has a frame-like shape, and the wall 3m has a plate-like shape. The housing 3A comprises four walls 3n (portions, plates, side walls, end walls, standing walls, stretched portions, first walls) each of which includes a side surface 3p (a surface, a circumferential surface) and stretches across the wall 3k and the wall 3m. An opening 3r having a rectangular shape is provided to the wall 3k.

The housing 3A is made up from a combination of a plurality of portions (divided portions, members). The housing 3A comprises a first member 3Fr (a first portion, a front side member, a cover, a bezel, a frame) including at least the wall 3k, and a second member 3Rr (a second portion, a rear side member, a base, a bottom, a plate) at least including the wall 3m, as an example. In the first embodiment, the walls 3n are configured as a part of the first member 3Fr. Each of the walls 3n stretches across an end 3n1 (one end, a front end, the front surface 3a) located on the side of the opening 3r in the thickness direction of the housing 3A, and an end 3n2 (the other end, a rear end, the rear surface 3b) located opposite the end 3n1 and covers the circumference (a side surface 4b, see FIGS. 3 and 4) of a display device 4.

In the first embodiment, as an example, the first member 3Fr is made of a synthetic resin material, and the second member 3Rr is made of a metallic material. Because the walls 3n are included in the first member 3Fr, as mentioned earlier, if the first member 3Fr is to be made of a metallic material having a higher specific gravity than that of a synthetic resin material, the housing 3A could become heavy. Furthermore, because the walls 3n are not included in the second member 3Rr, if the second member 3Rr is to be made of a synthetic resin material that is softer (easily bent, deformed) than a metallic material, the stiffness of the housing 3A could be reduced. Because, in the first embodiment, the first member 3Fr is made of a synthetic resin material and the second member 3Rr is made of a metallic material, as an example, the housing 3A can be reduced in weight, while ensuring the stiffness and the strength of the housing 3A. Such a combination of the materials (properties of the materials) is merely an example, and other combinations of materials may also be used.

Figure 3:
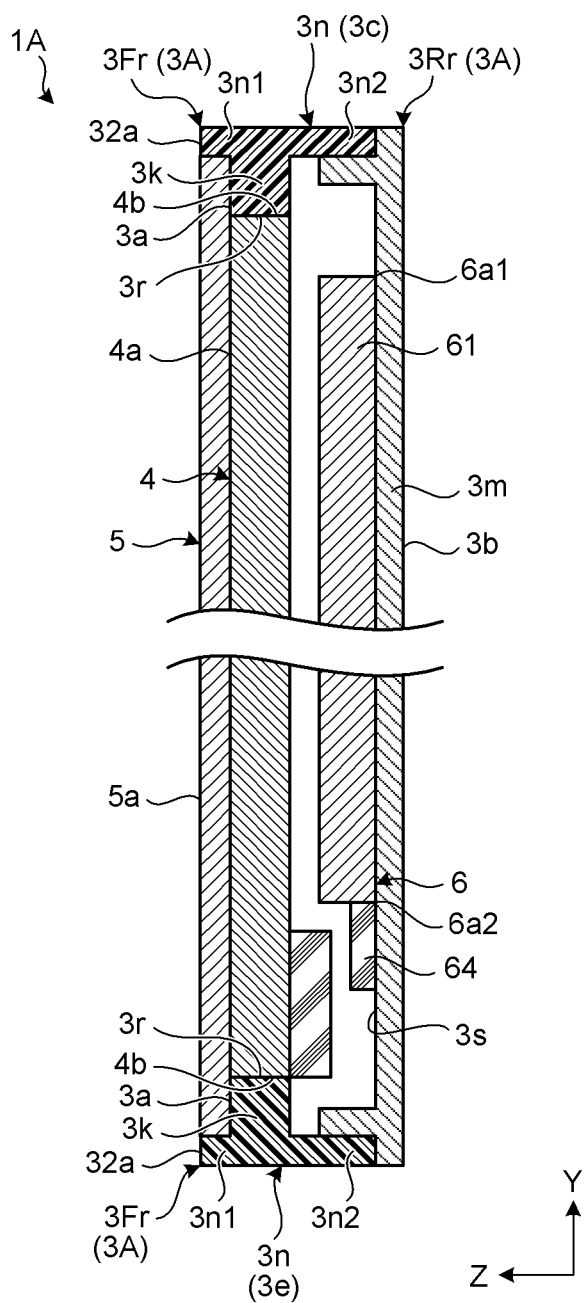
FIG. 3 is an exemplary schematic diagram illustrating a cross section taken along the line III-III in FIG. 1, in the first embodiment.
Figure 4:
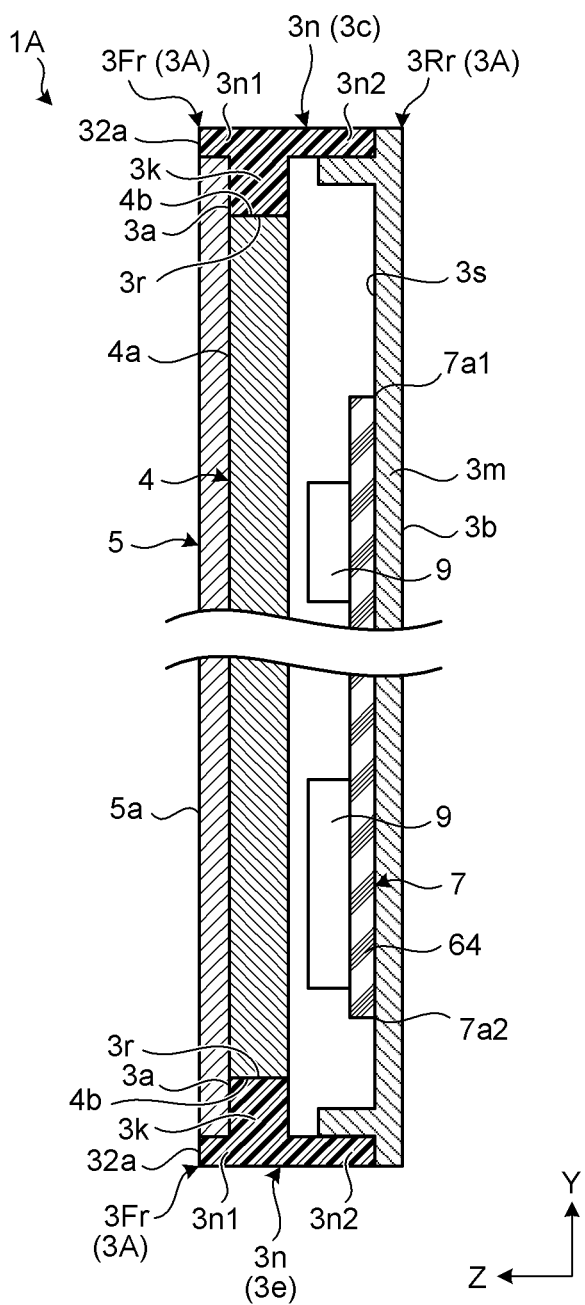
FIG. 4 is an exemplary schematic diagram illustrating a cross taken along the line IV-IV in FIG. 1, in the first embodiment.

In the first embodiment, as an example, as illustrated in FIGS. 3 and 4, the display device 4 (a display module, a display, a panel, a display component) is housed in the housing 3A. Specifically, the display surface 4a (a display screen, a display, a first surface, an area, a portion, a region, a wall) of the display device 4 located on the side of the front surface 3a is exposed to the front side (outside) of the housing 3A through the opening 3r. In other words, the display surface 4a is exposed through the opening 3r. The display device 4 includes the display surface 4a and a rear surface 4d located opposite the display surface 4a. A user of the display can view the display surface 4a from the front side through the opening 3r. The display device 4 has an external appearance of a rectangular shape (in the first embodiment, an oblong shape, as an example) in the front view. The display device 4 also has a cuboid shape that is thin and flat in the front-back direction. The display device 4 is a liquid crystal display (LCD), an organic electro-luminescent display (GELD), or a plasma display panel (PDP), for example.

In the first embodiment, as an example, as illustrated in FIGS. 3 and 4, a transparent, relatively thin, and rectangular input operation panel 5 (as an example, a touch panel, a touch sensor, an operation surface) is provided to the front side (the frontal side, the side of the wall 3k) of the display device 4. The input operation panel 5 covers the display surface 4a. An operator (e.g., a user) can make inputs by making operations such as touching, pressing, rubbing the input operation panel 5, or moving a hand, a finger, or a stylus near the input operation panel 5. Light output from the display surface 4a of the display device 4 penetrates through the input operation panel 5 and travels toward the front side (outside) of the housing 3A through the opening 3r on the wall 3k. The input operation panel 5 is an example of an input module.

In the first embodiment, as an example, as illustrated in FIGS. 3 and 4, the display device 4 and the input operation panel 5 are supported by the first member 3Fr. Specifically, the display device 4 and the input operation panel 5 are fixed to the first member 3Fr with fixtures (fixing portions, clamps, e.g., screws, clamps, or portions, not illustrated), an adhesive (e.g., an adhesive agent, or double-sided adhesive tape, not illustrated), and the like. The display device 4 and the input operation panel 5 are fixed to the wall 3k or the wall 3n (the end 3n1 of the wall 3n). In the first embodiment, as an example, an end 32a (a surface, an end) of the first member 3Fr (the wall 3n of the first member 3Fr) that is located on the front side is laid along and continuously to a surface 5a (a front surface, a frontal surface) of the input operation panel 5. In the first embodiment, as an example, the front surface 3a of the wall 3k and the display surface 4a of the display device 4 are also laid continuously, and the front surface 3a and the display surface 4a are covered by the input operation panel 5.

In the first embodiment, as an example, as illustrated in FIGS. 3 and 4, a battery 6 (a cell, an assembled battery) and circuit boards 7 and 8 (a board, a printed board, a control board; the circuit board 8 is not illustrated in FIGS. 3 and 4) and the like that are electric components are housed behind the display device 4 (on the side closer to the rear surface 4d, behind side, back side, the side of the wall 3m, the opposite side of the display surface 4a) in the housing 3A. The electric components such as the battery 6, the circuit boards 7 and 8, and the display device 4 are electrically connected to each other via wiring (e.g., a cable, a flexible cable, and a flexible printed wiring board) not illustrated.

In the first embodiment, as an example, the battery 6 may be configured as a lithium-ion secondary battery. A lithium-ion secondary battery is a type of a non-aqueous electrolyte battery, and lithium ions in the electrolyte conduct electricity. Manganese, nickel, or iron phosphate is used as a cathode material, and an oxide material such as lithium titanium oxide (LTO) or a carbon material is used as an anode material. Used as electrolyte (an electrolyte solution, as an example) is an organic solvent, for example, such as ethylene carbonate or diethyl carbonate in which a lithium salt such as florin-based complex salt (LiBF4) is dissolved. In the first embodiment, as an example, the battery 6 is capable of supplying power that is required for enabling the television receiver 1A to operate, e.g., display videos and output sound, to the circuit boards 7 and 8, to the electric components in the housing 3A, such as the display device 4 and a speaker (not illustrated), etc. The battery 6 is also capable of supplying power to an external device connected to the circuit boards 7 and 8 via a connector and wiring, for example.

In the first embodiment, as an example, the battery 6 comprises a plurality of cells 61, 62, and 63, as illustrated in FIG. 1. The cells 61, 62, and 63 are electrically connected serially or in parallel. The cells 61, 62, and 63 are positioned side by side along the end 3c. In the first embodiment, as an example, the battery 6 comprises a circuit board 64. The electrodes (not illustrated) of the respective cells 61, 62, and 63 are connected (joined) to the circuit board 64 (conductor pattern of the circuit board 64), and, in this manner, the cells 61, 62, and 63 are integrated. Because the cells 61, 62, and 63 are integrated, production labors and costs can be reduced compared with a structure in which the cells 61, 62, and 63 are individually assembled. The circuit board 64 comprises a bus bar (a conductor, not illustrated) that electrically connects the circuit boards 7 and 8 to each of the cells 61, 62, and 63, or between the cells 61, 62, and 63, as an example. Electric components (not illustrated) are provided (implemented) to the circuit board 64. The electric components and the conductor pattern (wiring pattern not illustrated) on the circuit board 64 together form an electric circuit (an electronic circuit) that realizes a function for monitoring an output power (voltage), temperature, and the like of each of the cells 61, 62, and 63 or the battery 6, as an example.

Each of the cells 61, 62, and 63 is configured as an independent single cell comprising a chamber (an container) in which an electrolyte (an electrolyte solution), electrodes, a separator, and the like are housed (contained). Each of the cells 61, 62, and 63 has a cuboid shape (a plate-like shape, a rectangular plate-like shape, a card-like shape) that is thin and flat in the thickness direction of the housing 3A (the Z direction). In the first embodiment, as an example, each of the cells 61, 62, and 63 are covered by an insulating, flexible, sheet-like covering (a skin, a film) that is the outmost layer, without any hard casing (a shell). Therefore, according to the first embodiment, as an example, because the battery 6 has no casing, the battery 6 (the cells 61, 62, and 63) can be reduced in size (thickness) and weight. Therefore, the housing 3A (the television receiver 1A) can be configured small (thin) and light-weighted. In the first embodiment, as an example, each of the cells 61, 62, and 63 is configured as a bag (a part) partitioned from the others. Therefore, as an example, a local stress applied to the battery 6, because of an external force and the like, can be reduced, compared with a structure in which the cells 61, 62, and 63 are firmly coupled integrally.

In the first embodiment, as an example, a plurality of components 9 (parts, elements, electronic components, electric components) such as a central processing unit (CPU) are implemented on at least one of the circuit boards 7 and 8. The components 9 include heating elements. A cooling mechanism (a heat radiator or a heat receiving element not illustrated) may be provided to an electronic component 9 (a heating element) that generates a large amount of heat. The circuit boards 7 and 8, the components 9, and the like form at least a part of a controlling circuit (not illustrated). The controlling circuit may comprise a video signal processing circuit, a tuner, a high-definition multimedia interface (HDMI) signal processor, an audio-video (AV) input terminal, a remote controller signal receiver, a controller, a selector, an on-screen display, a storage (e.g., a read-only memory (ROM), a random access memory (RAM), a hard disk drive (HDD)), an audio signal processing circuit, and the like. The controlling circuit controls video outputs (e.g., moving images or still images) from the display surface 4a of the display device 4, sound outputs from a speaker (not illustrated), and light emissions from a light emitting diode (LED) (not illustrated). The display device 4, the speaker, the LED, and the like are examples of an output module.

Figure 5:
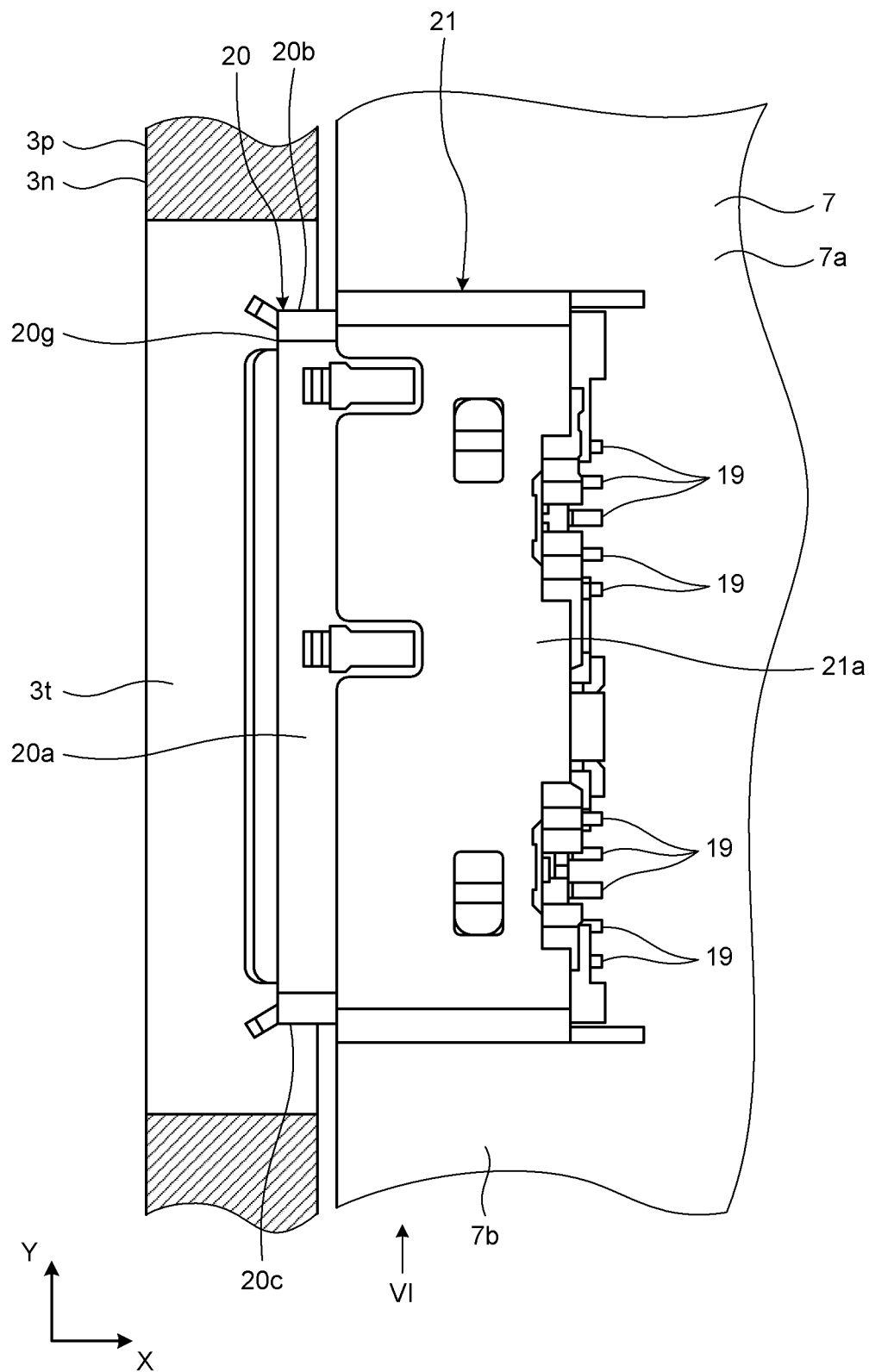
FIG. 5 is an exemplary cross-sectional view taken along the line V-V in FIG. 2, in the first embodiment.
Figure 6:
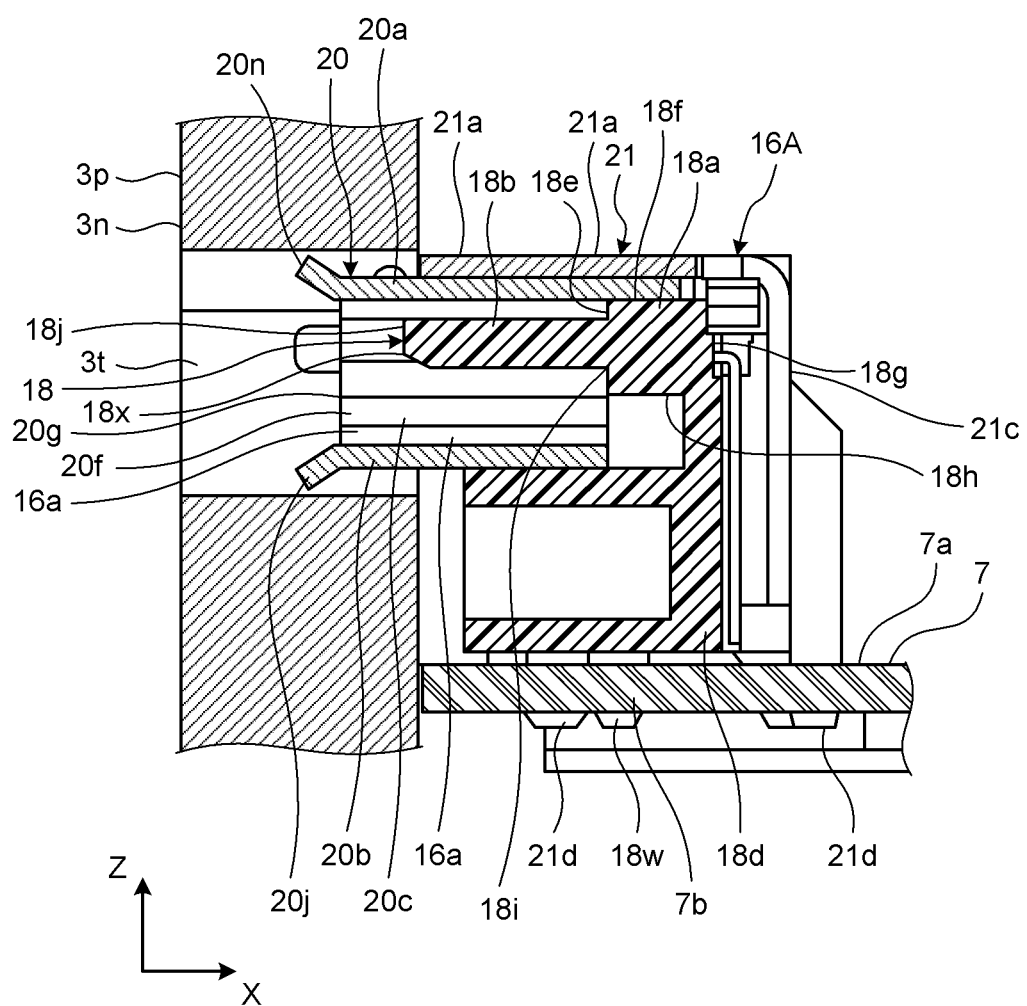
FIG. 6 is an exemplary schematic diagram as viewed from the arrow VI in FIG. 5, in the first embodiment.

In the first embodiment, as illustrated in FIGS. 5 and 6, a first connector 16A, being a connector 16, is provided (implemented) to an implementation surface 7a (a surface, one surface, a first surface) of the circuit board 7. The first connector 16A is a connector complying with the Universal Serial Bus (USB) 3.0 Micro-B, as an example. The first connector 16A is provided to an end 7b (an edge portion, a side) of the circuit board 7, as an example. The first connector 16A is exposed through an opening 3t (an orifice, a hole) provided to the walls 3n of the housing 3A. The opening 3t is an example of a second opening. The walls 3n are an example of a side wall.

Figure 7:
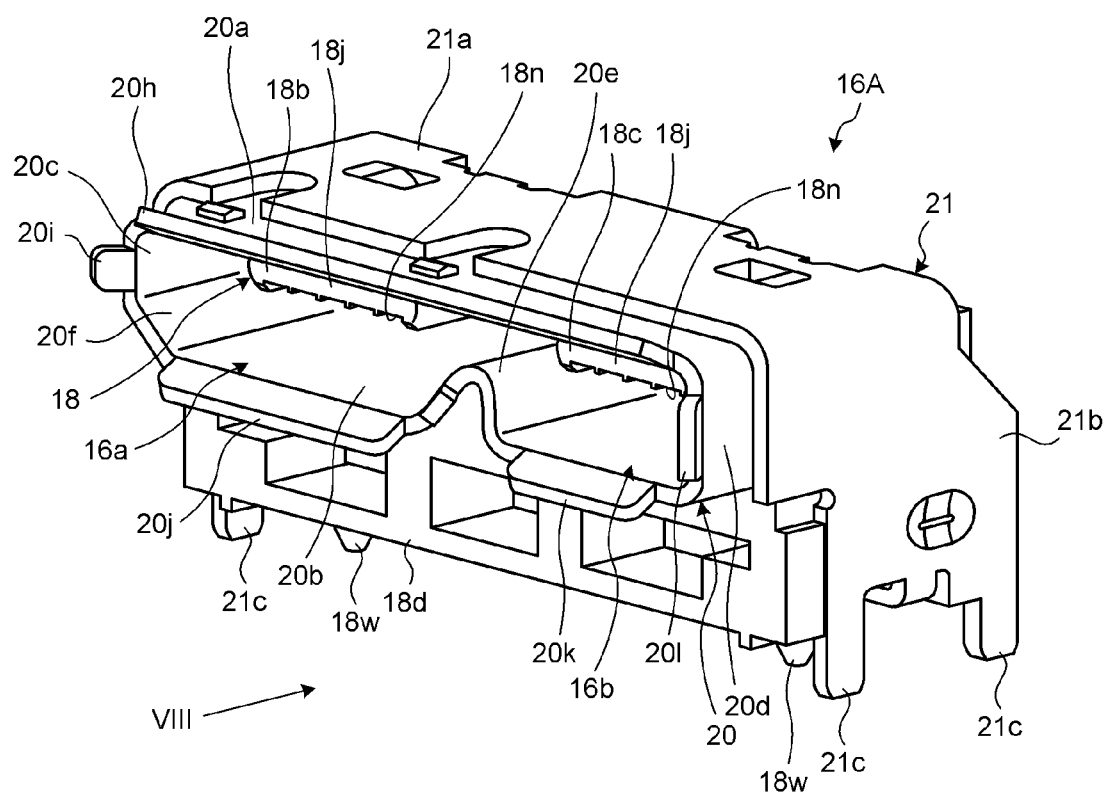
FIG. 7 is an exemplary perspective view of a connector on the television receiver in the first embodiment.
Figure 8:
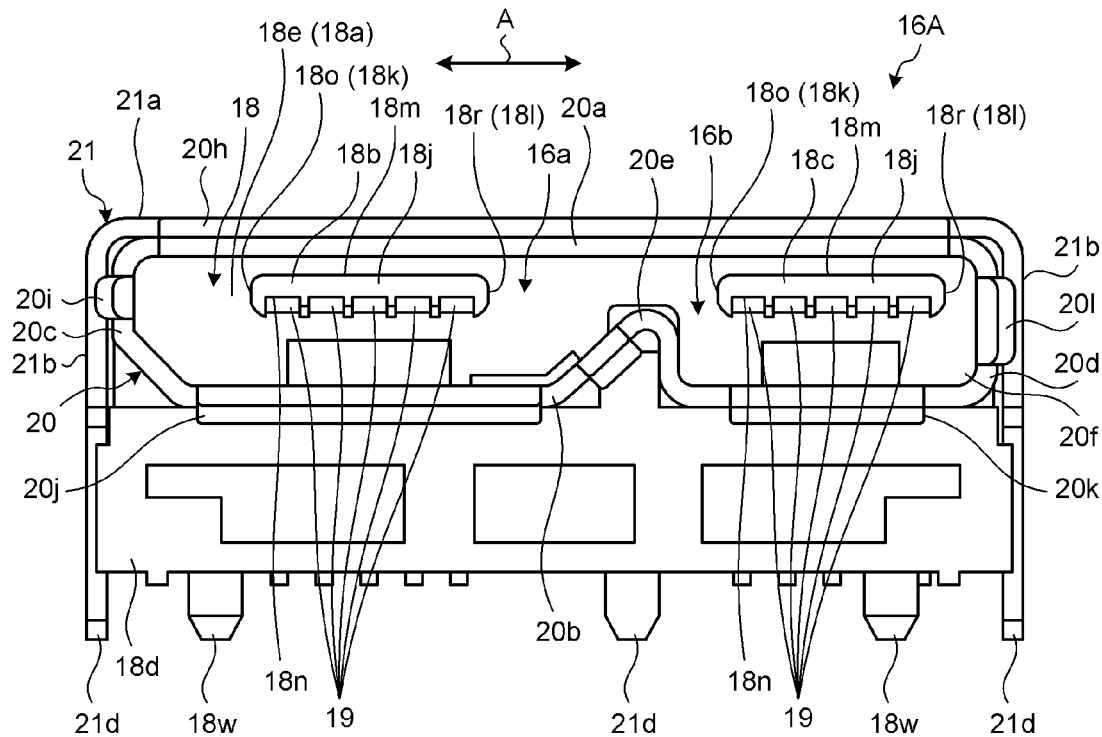
FIG. 8 is an exemplary schematic diagram as viewed from the arrow VIII in FIG. 7, in the first embodiment.

As illustrated in FIGS. 7 and 8, the first connector 16A comprises an insulating member 18 (a body, a backbone member, a supporting member, a support, a holding member, a holding portion), a plurality of terminal members 19 (implemented portions, fixed portions, junctures, supports, supporting portions, connected portions, connection portions, continuous portions, concatenated portions, continuing portions, running portions, terminals, electrode members, electrodes), a container 20 (a member, a backbone member, a frame, a portion, a shell, a metallic member), and a supporting member 21 (a member, a backbone member, a frame, a portion). The first connector 16A comprises two (a plurality of) fitting portions 16a and 16b (engage portions, insertion portions, connection portions). The fitting portion 16a comprises an insertion portion 18b, and the fitting portion 16b includes an insertion portion 18c. An external connector (a connector, a counterpart connector, the other connector, another connector, a plug connector (see FIG. 10)) is connected to the first connector 16A.

Figure 9:
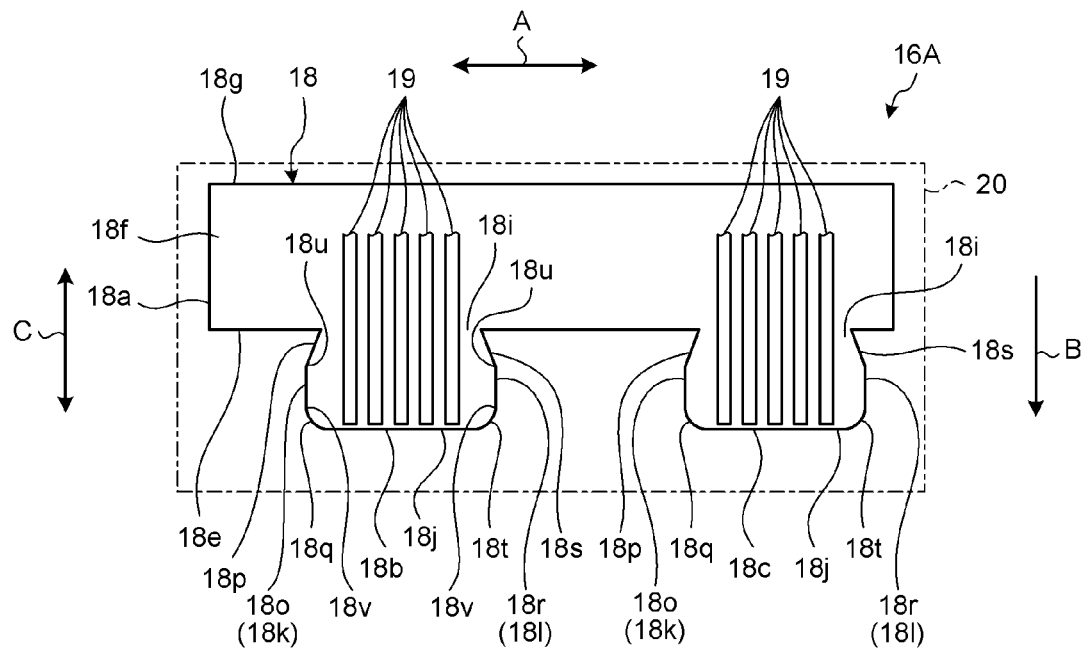
FIG. 9 is an exemplary schematic diagram of the connector of the television receiver in the first embodiment.

The insulating member 18 is made of an insulating material such as a resin, and has an insulating property. As illustrated in FIGS. 6, 8, and 9, the insulating member 18 comprises a base portion 18a (a portion, a first portion), two of the insertion portions 18b and 18c (portions, second portions), and an elevating portion 18d (a portion, a third portion, a foot portion, a foot).

The base portion 18a has a cuboid shape. The base portion 18a comprises four surfaces 18e, 18f, 18g, and 18h extended along the longitudinal direction of the base portion 18a (in the direction of the arrow A illustrated in FIGS. 8 and 9).

The insertion portions 18b and 18c extend from the base portion 18a. More specifically, the insertion portions 18b and 18c extend from the surface 18e of the base portion 18a toward the opening 3t. The insertion portions 18b and 18c are inserted into a connection portion 23c of an external connector 23. The insertion portions 18b and 18c are positioned so as to be spaced apart from each other in the longitudinal direction of the base portion 18a. Each of the insertion portions 18b and 18c has a flat shape. Each of the insertion portions 18b and 18c comprises a base end 18i (an end, one of ends) located on a side of the base portion 18a, and a tip end 18j (an end, other one of the ends). Each of the insertion portions 18b and 18c comprises a pair of sides 18k and 18l, and a connecting portion 18m connecting the pair of sides 18k and 18l. A plurality of recessed portions 18n are provided to a portion of the connecting portion 18m facing the circuit board 7, and the terminal members 19 are provided in the recessed portions 18n, respectively.

The sides 18k and 18l are examples of portions (surface portions) that are brought in contact with the external connector 23 when the external connector 23 is connected to the first connector 16A. The side 18k comprises a side surface 18o and two slanted surfaces 18p and 18q. The side 18l comprises a side surface 18r and two slanted surfaces 18s and 18t. The slanted surfaces 18p and 18s are provided to the side surfaces 18o and 18r, respectively, on the side of one end 18u located closer to the base portion 18a. The side surfaces 18o and 18r are examples of a portion extended along the direction in which the external connector 23 is inserted into or removed from the first connector 16A (the direction along the arrow C in FIG. 9). The slanted surfaces 18q and 18t are provided to the side surfaces 18o and 18r, respectively, on the side of the other end 18v located opposite the one end 18u. The slanted surfaces 18p, 18q, 18s, and 18t are examples of a portion comprising a step portion with respect to the portion extending along the direction in which the external connector is inserted into or removed (the side surface 18o or 18r). The slanted surfaces 18p, 18q, 18s, and 18t are examples of portions recessed from 18o and 18r.

In the first embodiment, the slanted surfaces 18p, 18q, 18s, and 18t are provided to both of one end 18u and the other end 18v, but embodiments are not limited thereto, and the slanted surfaces 18p, 18q, 18s, and 18t may be provided at least to one of the one end 18u and the other end 18v. Furthermore, in the first embodiment, the slanted surfaces 18p, 18q, 18s, and 18t are provided to both of the insertion portions 18b and 18c, but embodiments are not limited thereto, and the slanted surfaces 18p, 18q, 18s, and 18t may be provided to only one of the insertion portions 18b and 18c. The side surfaces 18o and 18r are laid along the direction in which the insertion portions 18b and 18c extend from the base portion 18a (in the direction along the arrow B in FIG. 9).

Each of the slanted surfaces 18p and 18q is slanted with respect to the side surface 18o, to reduce the width of the insertion portions 18b and 18c (the width along the longitudinal direction of the base portion 18a) more as the slanted surfaces 18p and 18q extend further away from the side surface 18o. Each of the slanted surfaces 18s and 18t is slanted with respect to the side surface 18r, to reduce the width of the insertion portions 18b and 18c more as the slanted surfaces 18s and 18t extend further away from the side surface 18r. Each of the slanted surfaces 18p and 18s is a flat surface, as an example. Each of the slanted surfaces 18q and 18t is a curved surface, as an example. The length of each of the slanted surfaces 18q and 18t provided to the other end 18v is shorter than that of each of the slanted surfaces 18p and 18s provided to the one end 18u in the direction in which the insertion portions 18b and 18c extend from the base portion 18a (in the direction along the arrow B in FIG. 9).

The elevating portion 18d comprises pins 18w (portions, protrusions, foot portions, feet). The pins 18w penetrate through the circuit board 7, and are fixed to the circuit board 7.

The terminal members 19 are made of copper alloy, as an example, with a surface plated with gold, silver tin, nickel, and the like, and have a conductive property. The terminal members 19 are provided to the insulating member 18 by insert molding or pressure molding, for example. The terminal members 19 are provided to each of the insertion portions 18b and 18c, and are electrically connected to the connection portion 23c of the external connector 23. The terminal members 19 are also electrically connected to the circuit board 7. The terminal members 19 are fixed to the circuit board 7 by solder (not illustrated).

The container 20 is made of a metallic material, as an example, and has a tube-like shape. The insertion portions 18b and 18c are housed in the container 20. The container 20 is joined (connected) to the insulating member 18. The elevating portion 18d of the insulating member 18 is positioned outside of the tube of the container 20. The container 20 comprises a top plate 20a (a portion, a first portion), a bottom 20b (a portion, a second portion), and a pair of sides 20c and 20d (portions, third portions). Provided to the bottom 20b is a protrusion 20e protruding toward the top plate 20a. There is a space provided between the container 20 and the insertion portions 18b and 18c, and the external connector 23 is inserted into the space. An opening 20f is formed on one end 20g of the container 20, and the external connector 23 is connected through the opening 20f (the one end 20g). Guides 20h, 20i, 20j, 20k, and 20l (parts, protrusions, inclined portions) are provided to the one end 20g.

The supporting member 21 is made of a metallic material or an insulating material. The supporting member 21 supports the insulating member 18 and the container 20. The supporting member 21 also covers the insulating member 18 and the container 20. The supporting member 21 comprises a top plate 21a, a pair of sides 21b, and a rear surface 21c. Pins 21d (feet, foot portions, portions) are provided to the rear surface 21c and the pair of sides 21b. The pins 20d penetrate through the circuit board 7, and are fixed to the circuit board 7.

In the first embodiment, as illustrated in FIG. 6, as an example, the portion 16a of the first connector 16A including the one end 20g of the container 20 projects out from the circuit board 7. A portion 1a includes a portion of the container 20 exposed from the top plate 21a, as an example. In the first embodiment, as an example, the one end 20g of the container 20 is positioned in the opening 3t. In the first embodiment, as an example, tip ends 18x that are portions of the respective insertion portions 18b and 18c are also positioned in the opening 3t.

A method of manufacturing the first connector 16A in the structure described above (a connector manufacturing method) comprises: resin-molding the insulating member 18 with a molding machine; and attaching the insulating member 18 thus molded and the container 20 to the supporting member 21. The insulating member 18 is press-fitted into the container 20, as an example. The molding machine includes dies.

Figure 10:
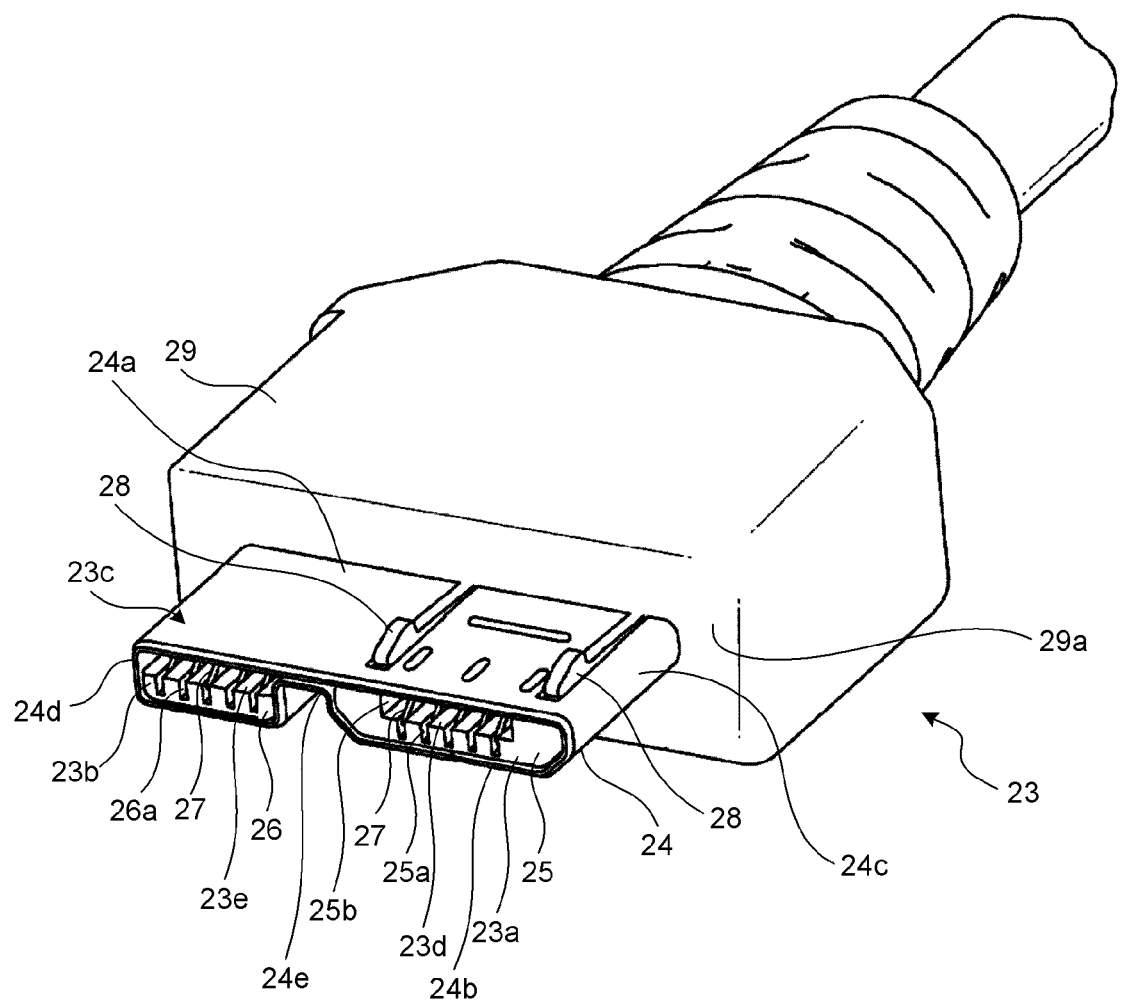
FIG. 10 is an exemplary perspective view of an external connector in the first embodiment.

As illustrated in FIG. 10, the external connector 23 comprises a shell 24 (a member, a backbone member, a frame, a portion, a metallic member), insulating members 25 and 26 (bodies, backbone members, supporting members, supports, holding members, holding portions), a plurality of terminal members 27 (implemented portions, fixed portions, junctures, supports, supporting portions, connected portions, connection portions, continuous portions, concatenated portions, continuing portions, running portions, terminals, electrode members, electrodes), engage portions 28 (claws, claw portions, protrusions), and a base portion 29 (a body, a portion). The external connector 23 also comprises two (a plurality of) fitting portions (engage portions, insert portions, connection portions) 23a and 23b. The fitting portions 23a and 23b fits into (engage with) the respective fitting portions 16a and 16b on the first connector 16A. The shell 24, the insulating members 25 and 26, the terminal members 27 make up the connection portion 23c.

The insulating members 25 and 26 are made of an insulating material such as a resin, and have an insulating property. A plurality of recessed portions 25a and 26a are provided to the respective insulating members 25 and 26, and the terminal members 27 are provided to the respective recessed portions 25a and 26a. A recessed portion 25b is provided in the insulating member 25. The recessed portions 25a are provided to the bottom surface of the recessed portion 25b.

The terminal members 27 are made of copper alloy, as an example, with a surface plated with gold, silver tin, nickel, and the like, and have a conductive property. The terminal members 19 are electrically connected to the respective terminal members 19 of the first connector 16A.

The shell 24 is made of a metallic material, as an example. The shell 24 has a tube-like shape, and the insulating members 25 and 26 are housed in the shell 24. The shell 24 comprises a top plate 24a (a portion, a first portion), a bottom 24b (a portion, a second portion), and a pair of sides 24c and 24d (portions, third portions). A protrusion 24e protruding toward the top plate 24a is formed on the bottom 24b. The internal space (in the tube) of the shell 24 is partitioned into two spaces by the protrusion 24e, and the insulating member 25 is arranged in one of the spaces, and the insulating member 26 is arranged in the other space. The external connector 23 comprises an opening 23d (an orifice, a recessed portion) surrounded by the recessed portion 25b of the insulating member 25 and the top plate 24a, and an opening 23e (orifice, recessed portion) surrounded by the insulating member 26, the top plate 24a, the side 24d, and the protrusion 24e. The insertion portions 18b is inserted into the opening 23d, and the insertion portion 18c is inserted into the opening 23e. The two engage portions 28 are provided to the top plate 24a of the shell 24. The engage portions 28 are engaged with the engage portions provided to the top plate 20a of the first connector 16A, when the insertion portions 18b and 18c are inserted into the respective openings 23d and 23e.

The base portion 29 has a cuboid shape. The shell 24, the insulating members 25 and 26, and the engage portions 28 protrude from one surface 29a of the base portion 29.

Figure 11:
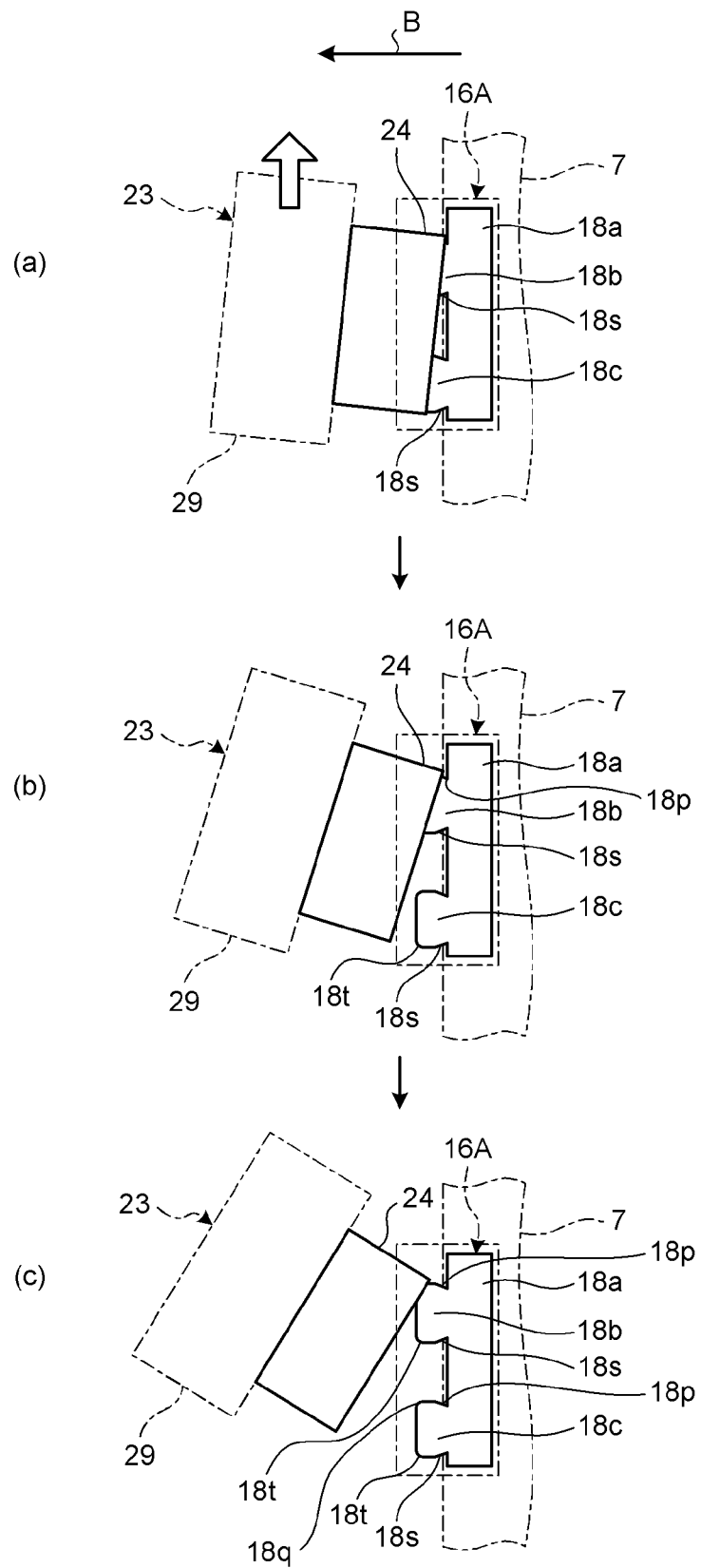
FIG. 11 is an exemplary schematic diagram for explaining how the external connector is removed from the connector on the television receiver, in the first embodiment.

To remove the external connector 23 having the structure described above from the first connector 16A, as an example, as illustrated sequentially in FIG. 11, when the external connector 23 is removed by being moved diagonally with respect to the direction in which the insertion portions 18b and 18c of the first connector 16A extend (the direction of the arrow B), the slanted surfaces 18p, 18q, 18s, and 18t permit such a diagonal movement of the external connector 23. As an example, the slanted surfaces 18p, 18q, 18s, and 18t of the insertion portions 18b also permit a diagonal movement of the recessed portion 25b. The slanted surfaces 18p, 18q, 18s, and 18t of the insertion portions 18b also permit a diagonal movement of the side 24d and the protrusion 24e.

As explained above, in the first embodiment, when the external connector 23 is removed by being moved diagonally with respect to the direction in which the insertion portions 18b and 18c of the first connector 16A extend, the slanted surfaces 18p, 18q, 18s, and 18t permit such a diagonal movement of the external connector 23. Therefore, even if the external connector 23 is removed by being moved diagonally with respect to the direction in which the insertion portions 18b and 18c of the first connector 16A extend, the external connector 23 is prevented from pressing the insertion portions 18b and 18c in a direction bending the insertion portions 18b and 18c. Hence, concentration of stress on the insertion portions 18b and 18c can be suppressed, and therefore, the insertion portions 18b and 18c can be suppressed from being damaged. Furthermore, when the external connector 23 is removed by being moved diagonally with respect to the direction in which the insertion portions 18b and 18c of the first connector 16A extend, because the slanted surfaces 18p, 18q, 18s, and 18t permit the diagonal movement of the external connector 23, the external connector 23 can be removed from the first connector 16A more easily.

In the first embodiment, a plurality of components 9 such as CPU may be implemented on the circuit board 7. A cooling mechanism may be provided to the components 9 implemented on the circuit board 7, as an example. In the first embodiment, because a load applied to the first connector 16A when the external connector 23 is removed is reduced, a load applied to the components 9 when the external connector 23 is removed can also be reduced. Therefore, the components 9 may be arranged near the external connector 23.

Figure 12:
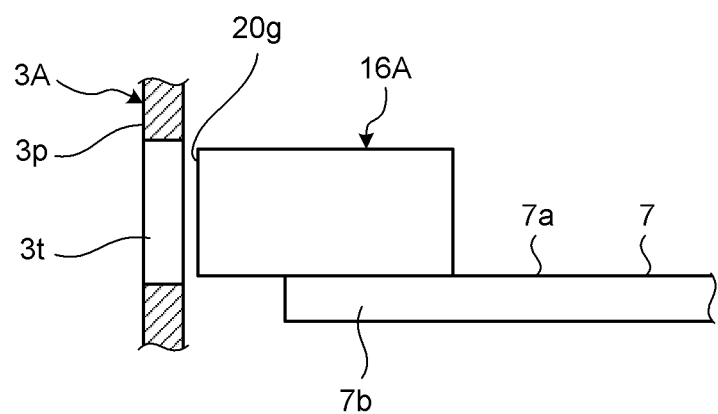
FIG. 12 is an exemplary schematic diagram of a connector and a circuit board in a television receiver according to a first modification of the first embodiment.

Modifications of first embodiment will now be explained. The first connector 16A according to a first modification illustrated in FIG. 12 is entirely positioned in the housing 3A.

Figure 13:
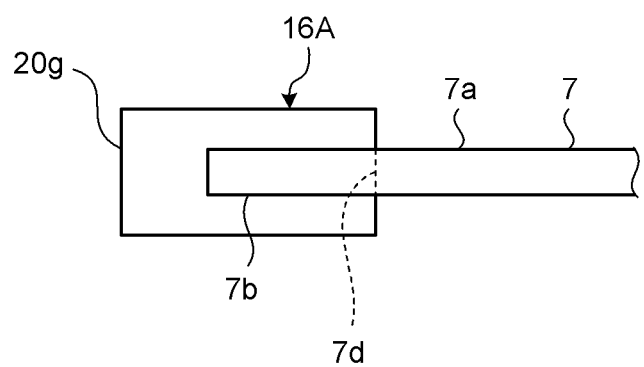
FIG. 13 is an exemplary schematic diagram of a connector and a circuit board in a television receiver according to a second modification of the first embodiment.

The first connector 16A according to a second modification illustrated in FIG. 13 is positioned in a recessed portion 7d provided to the circuit board 7. In this manner, an amount in which the first connector 16A protrudes from the implementation surface 7a of the circuit board 7 can be made relatively small.

Figure 14:
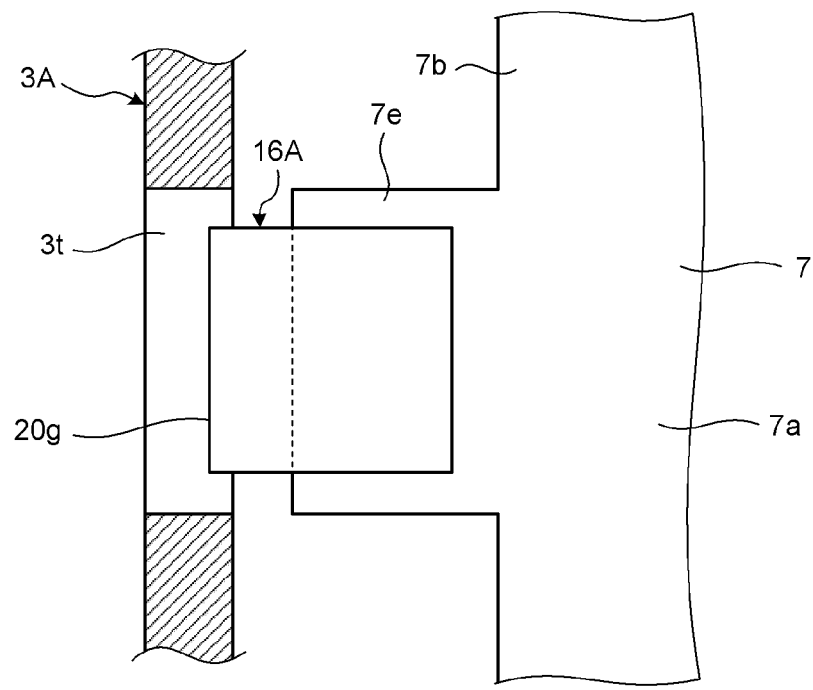
FIG. 14 is an exemplary schematic diagram of a connector and a circuit board in a television receiver according to a third modification of the first embodiment.

The first connector 16A according to a third modification illustrated in FIG. 14 is provided to a protrusion 7e formed on an end 7b of the circuit board 7. In this manner, the circuit board 7 can be prevented from being increased in size, while ensuring the first connector 16A to be positioned in the opening 3t.

Figure 15:
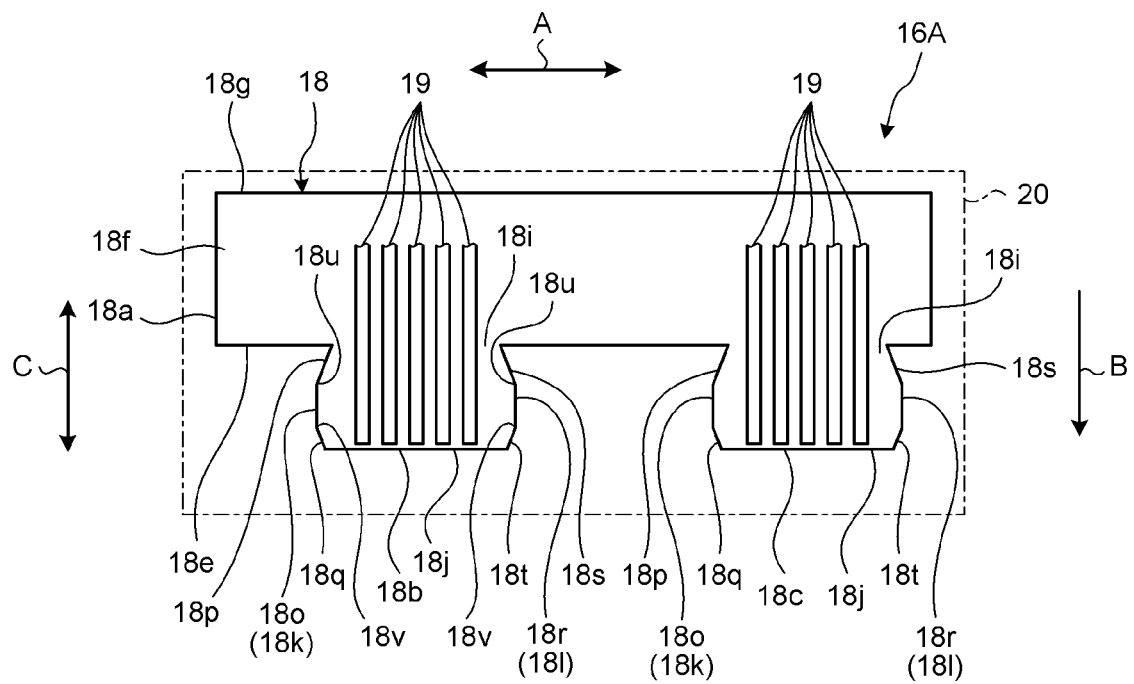
FIG. 15 is an exemplary schematic of a connector on a television receiver according to a fourth modification of the first embodiment.

In the first connector 16A according to the fourth modification illustrated in FIG. 15, the slanted surfaces 18q and 18t are flat.

Figure 16:
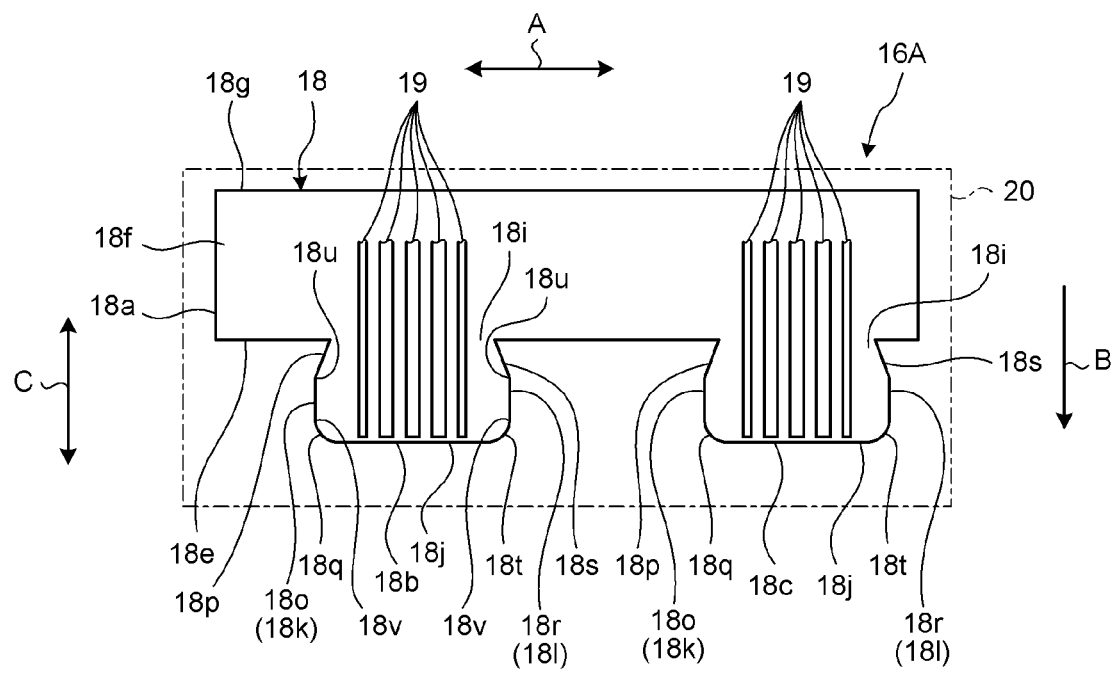
FIG. 16 is an exemplary schematic of a connector on a television receiver according to a fifth modification of the first embodiment.

In the first connector 16A according to a fifth modification illustrated in FIG. 16, among the terminal members 19 provided to the insertion portions 18b and 18c, the terminal members 19 located on both ends of each of the insertion portions 18b and 18c have a smaller width than that of the others. In this manner, the distance between each of the slanted surfaces 18p, 18q, 18s, and 18t and the terminal members 19 can be increased relatively.

Figure 17:
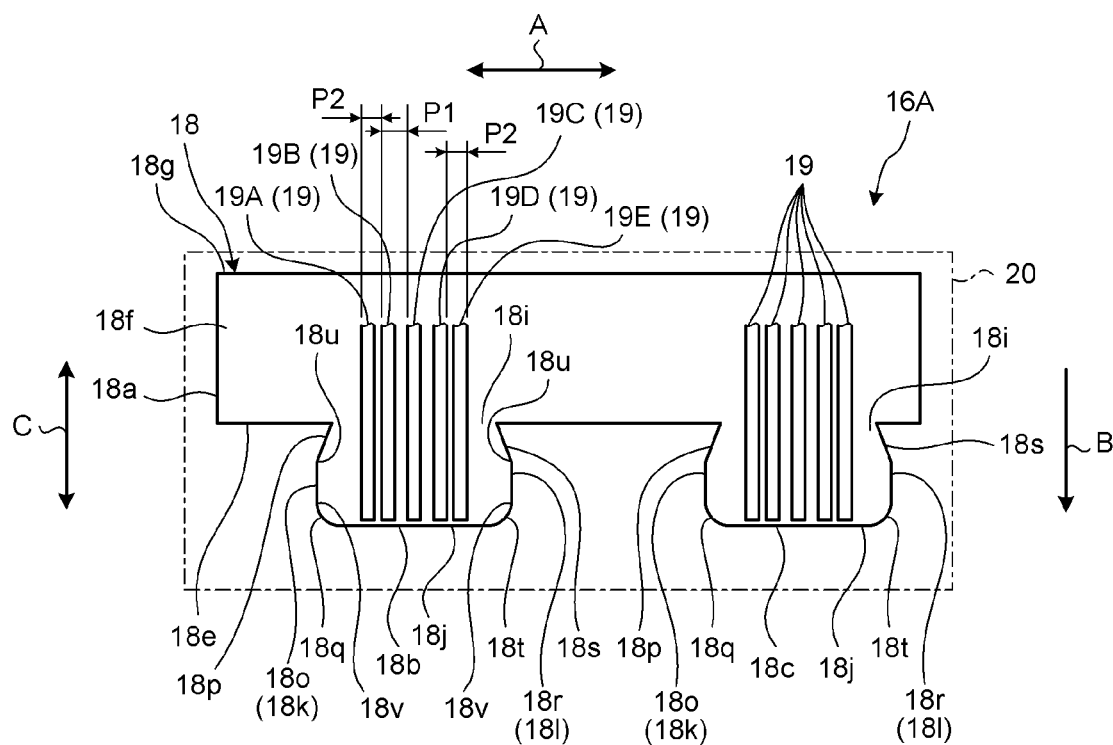
FIG. 17 is an exemplary schematic of a connector on a television receiver according to a sixth modification of the first embodiment.

In the first connector 16A according to a sixth modification illustrated in FIG. 17, the terminal members 19 on the both of the ends of each of the insertion portions 18b and 18c are provided at a pitch narrower than that in the center. For convenience, the terminal members 19 are said to be, from the one on the left to the one on the right in FIG. 17, a first terminal member 19A, a second terminal member 19B, a third terminal member 19C, a fourth terminal member 19D, and a fifth terminal member 19E. A pitch P2 between the first terminal member 19A and the second terminal member B and the pitch P2 between the fourth terminal members 19D and the fifth terminal members 19E are narrower than the pitch P1 between the second terminal members 19B and the third terminal members 19C. In this manner, the distance between each of the slanted surfaces 18p, 18q, 18s, and 18t and the terminal members 19 can be increased relatively.

Figure 18:
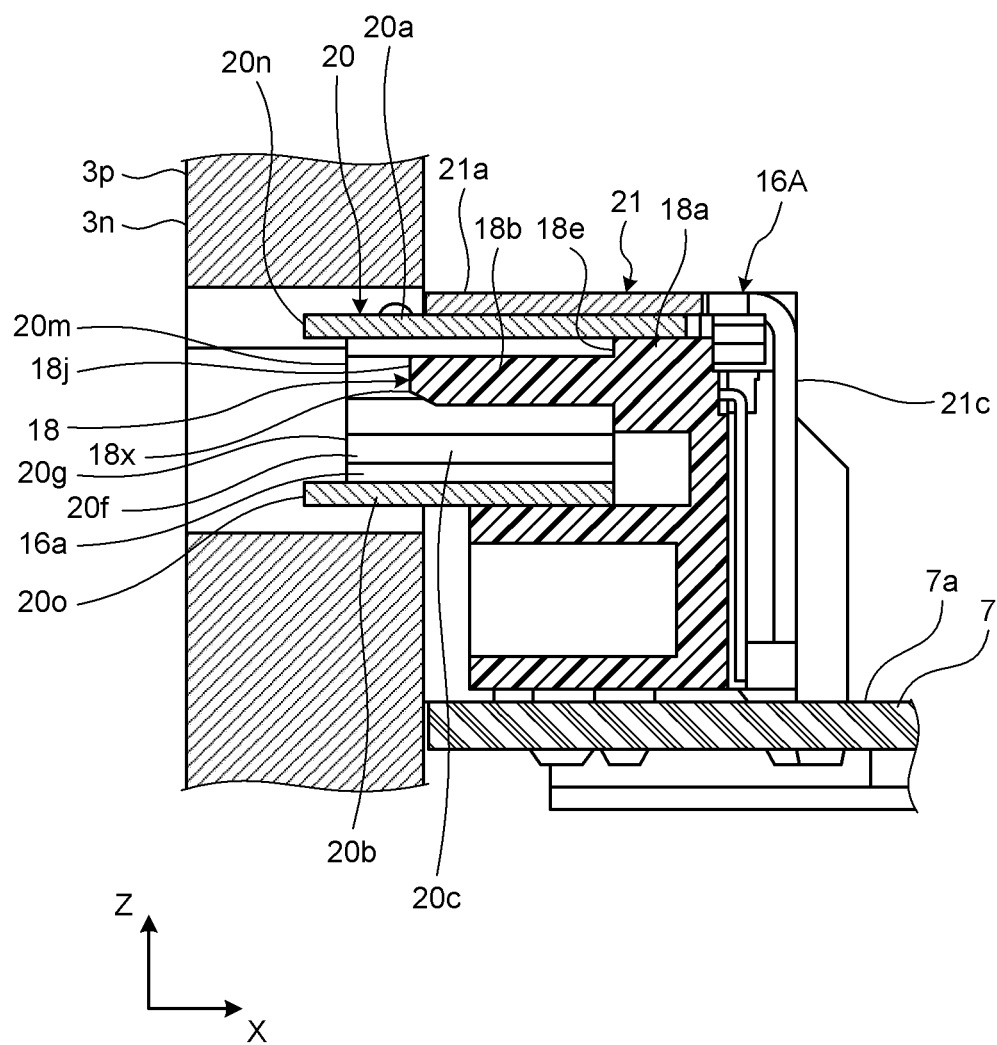
FIG. 18 is an exemplary cross-sectional view of a television receiver according to a seventh modification of the first embodiment viewed from the same position as in FIG. 6.

In the first connector 16A according to a seventh modification illustrated in FIG. 18, an end 20m of the side 20c and the end 20m of the side 20d, both of which is on the one end 20g of the container 20, are positioned closer to the base portion 18a than an end 20n of the top plate 20a and an end 20o of the bottom 20b. In this manner, even if the external connector 23 is removed by being moved diagonally with respect to the direction in which the insertion portions 18b and 18c of the first connector 16A extend, the external connector 23 can be suppressed from pressing the insertion portions 18b and 18c in a direction bending the insertion portions 18b and 18c. Therefore, the insertion portions 18b and 18c can be suppressed from being damaged.

An electronic device 1B according to a second embodiment is a personal computer, a television receiver, a smartphone, a smartbook, a cellular phone, a PDA, or the like, such as a so-called slate-type or a tablet type display device having a function of software keyboard.

Figure 19:
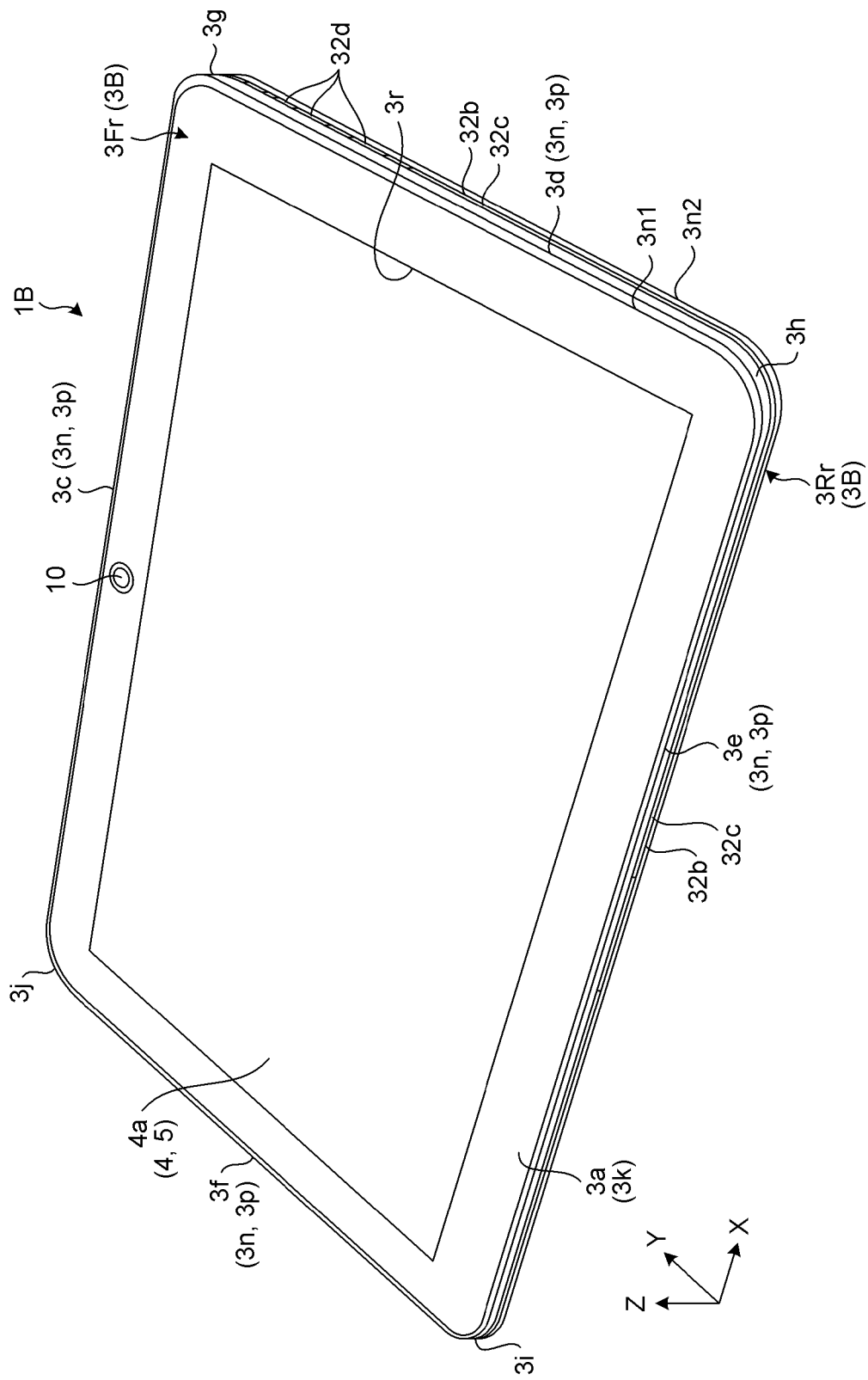
FIG. 19 is an exemplary perspective view of an electronic device according to a second embodiment.
Figure 20:
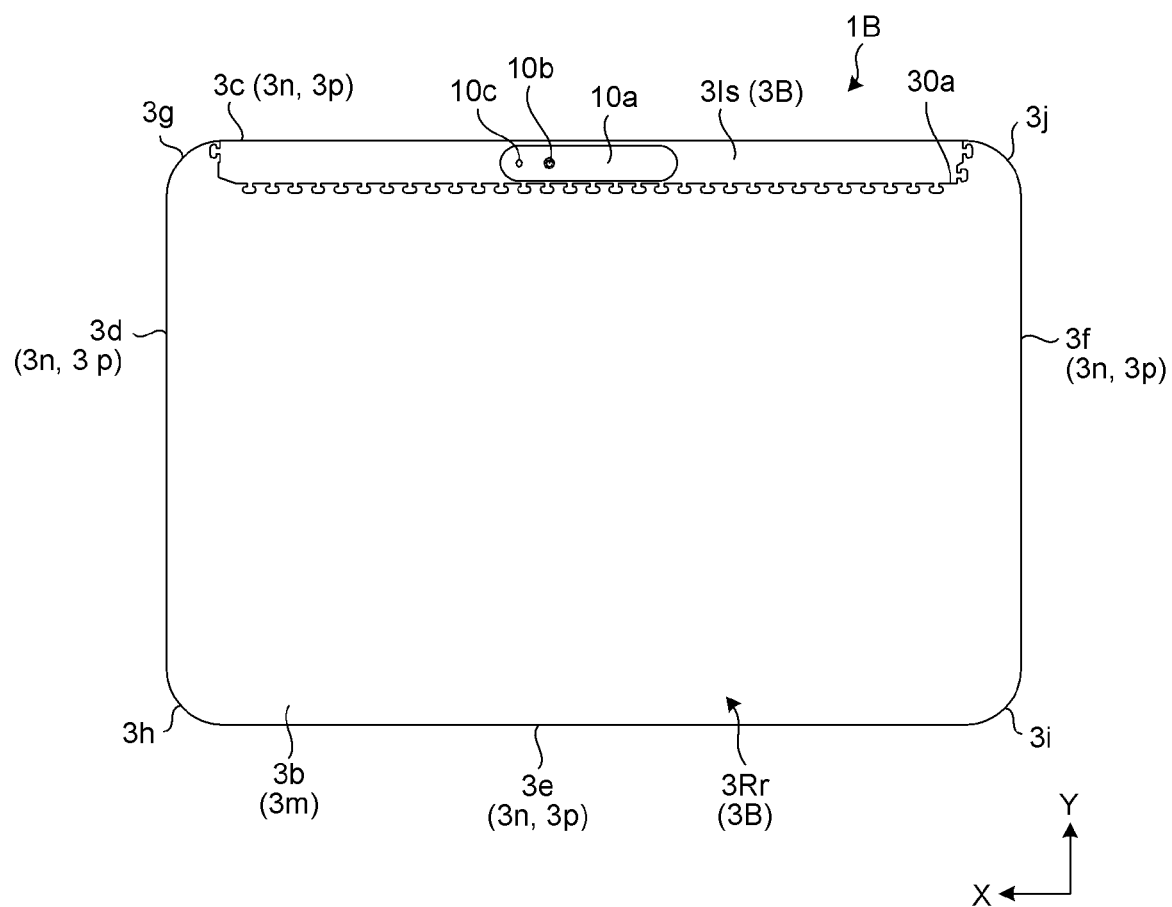
FIG. 20 is an exemplary rear view of the electronic device in the second embodiment.

In the second embodiment, as an example, as may be understood from FIGS. 19 and 20, a housing 3B of the electronic device 1B has an external appearance of a rectangular shape (in the second embodiment, an oblong shape, as an example) in the front view and the rear view. The housing 3B is also in a cuboid shape that is thin and flat in the front-back direction (the thickness direction of the housing 3B, the Z direction). The housing 3B comprises the front surface 3a (a frontal surface, a surface, a surface portion) and a rear surface 3b (a back surface, a surface, a surface portion) located on the opposite side of the housing 3B. The front surface 3a and the rear surface 3b are laid approximately in parallel (in the second embodiment, in parallel, as an example). The housing 3B also comprises four ends 3c to 3f (sides, edge portions) and four corners 3g to 3j (pointed portions, curved portions, ends) in the front view. The ends 3c and 3e are examples of longer sides. The ends 3d and 3f are examples of shorter sides.

The housing 3B comprises a wall 3k (a portion, a plate, a frame, a front wall, a frontal wall, a top wall) including the front surface 3a, and a wall 3m (a portion, a plate, a rear wall, a back wall, a bottom wall, a second wall) including the rear surface 3b. Each of the walls 3k and 3m has a rectangular shape (in the second embodiment, an oblong shape, as an example). The housing 3B comprises four walls 3n (portions, plates, side walls, end walls, standing walls, stretched portions, first walls) each of which includes a side surface 3p (a surface, a circumferential surface) and stretches across the wall 3k and the wall 3m. An opening 3r having a rectangular shape, as an example, is formed on the wall 3k.

The housing 3B may be made from a combination of a plurality of parts (divided portions). The housing 3B comprises a first member 3Fr (a first portion, a front side member, a cover, a bezel, a frame) including at least the wall 3k, and a second member 3Rr (a second portion, a rear side member, a base, a bottom, a plate) at least including the wall 3m, as an example. In the second embodiment, the walls 3n are basically configured as a portion of the first member 3Fr. In other words, each of the walls 3n stretches across an end 3n1 (one end, a front end, the front surface 3a) located on the side of the opening 3r in the thickness direction of the housing 3B and an end 3n2 (the other end, a rear end, the rear surface 3b) located on the opposite side of the end 3n1 (see FIG. 19), and covers the circumference of the display device 4 (the side surface 4b). The walls 3n are thicker than the other walls 3k and 3b. Therefore, the stiffness and the strength in the thickness direction of the housing 3B can be increased easily.

In the second embodiment, as an example, the first member 3Fr is made of a synthetic resin material, and the second member 3Rr is made of a metallic material. Therefore, according to the second embodiment, the weight of the housing 3B can be reduced while ensuring the stiffness and the strength of the housing 3B, in the same manner as in the first embodiment. Such a combination of the materials (properties of the materials) is merely an example, and other combinations of materials may also be used.

As illustrated in FIG. 19, a groove 32b extending along the ends 3c to 3f is formed in the middle (at the center) of the thickness direction of the outer surface of the walls 3n. A member 32c extending along the groove 32b is enclosed (embedded) in at least a portion of the groove 32b. The walls 3n and the member 32c may be made of different materials or have different colors. By configuring the member 32c as a member harder than the walls 3n, as an example, the walls 3n is reinforced. By contrast, by configuring the member 32c as a member that is softer than the walls 3n (as an example, a flexible member), the bendability (flexibility) of the walls 3n is increased, and the member 32c can absorb impacts better, as an example. In a portion of the groove 32b, an operation module 32d such as a switch may be provided, instead of the member 32c. Examples of the switch for the operation module 32d include a power switch, a volume control switch, and a reset switch. The member 32c and the operation module 32d may protrude from the walls 3n by the same height. Such a configuration can make the operation module 32d visually less prominent. Furthermore, because the member 32c and the operation module 32d are provided continuously, aesthetic quality can be improved.

Figure 21:
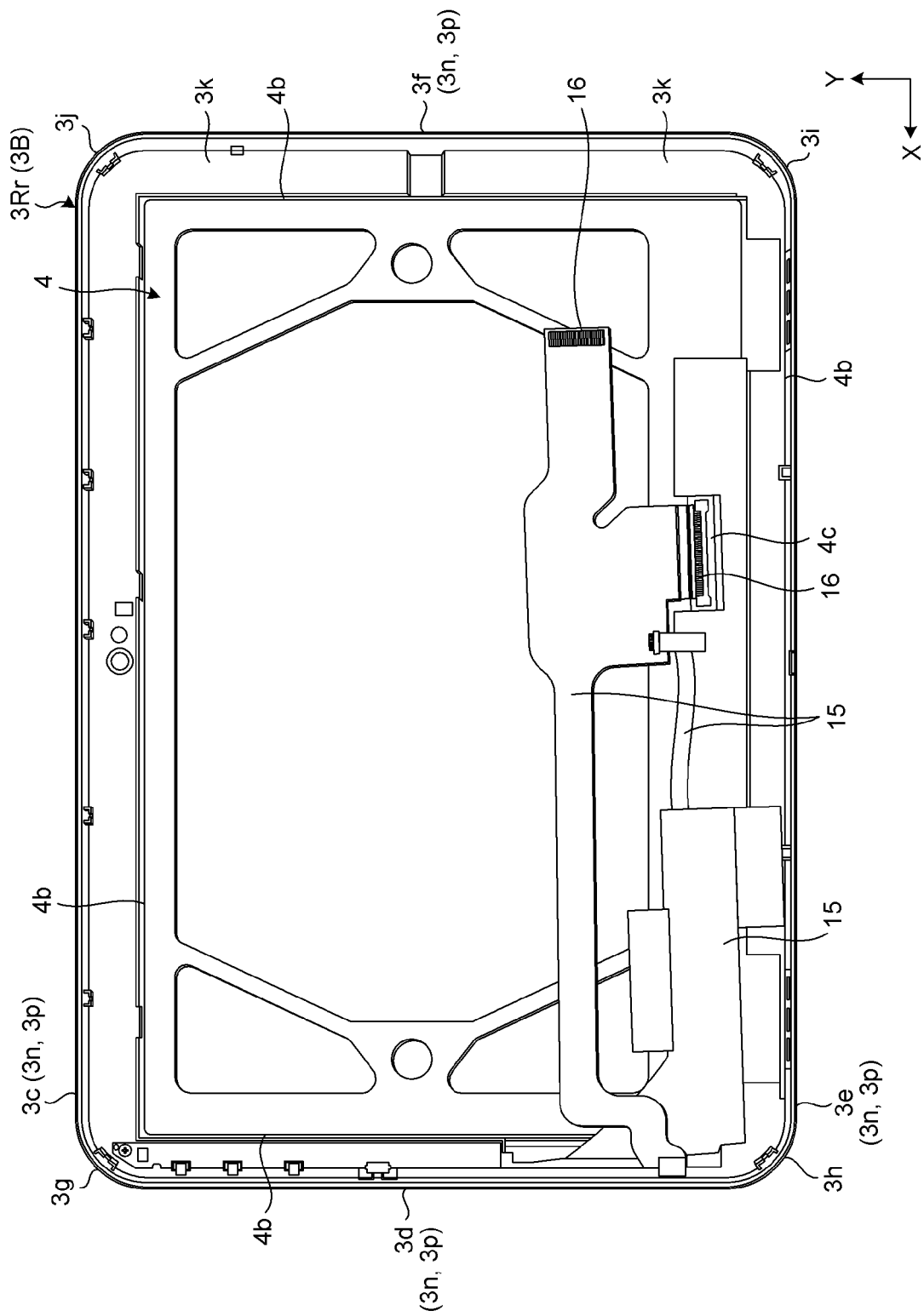
FIG. 21 is an exemplary plan view (rear view) of an internal structure of the electronic device comprising a first member, in the second embodiment.

In the second embodiment, as an example, as illustrated in FIGS. 19 and 21, the display device 4 (a display module, a display, a panel, a display component) is housed in the housing 3B. Specifically, the display surface 4a of the display device 4 located on the side of the front surface 3a is exposed to the front side (outside) of the housing 3B through the opening 3r. A user can view the display surface 4a from the front side through the opening 3r. The display device 4 has an external appearance of a rectangular shape (in the second embodiment, an oblong shape, as an example) in the front view. The display device 4 has a cuboid shape that is thin and flat in the front-back direction. The display device 4 is a LCD, an GELD, or a PDP, for example. In the second embodiment, as an example, a transparent, relatively thin, and rectangular input operation panel 5 (as an example, a touch panel, a touch sensor, an operation surface) is provided to the front side (the frontal side, the side of the wall 3k) of the display device 4, in the same manner as in the first embodiment. In the second embodiment, the display device 4 and the input operation panel 5 are supported by the first member 3Fr, in the same manner as in the first embodiment.

Figure 22:
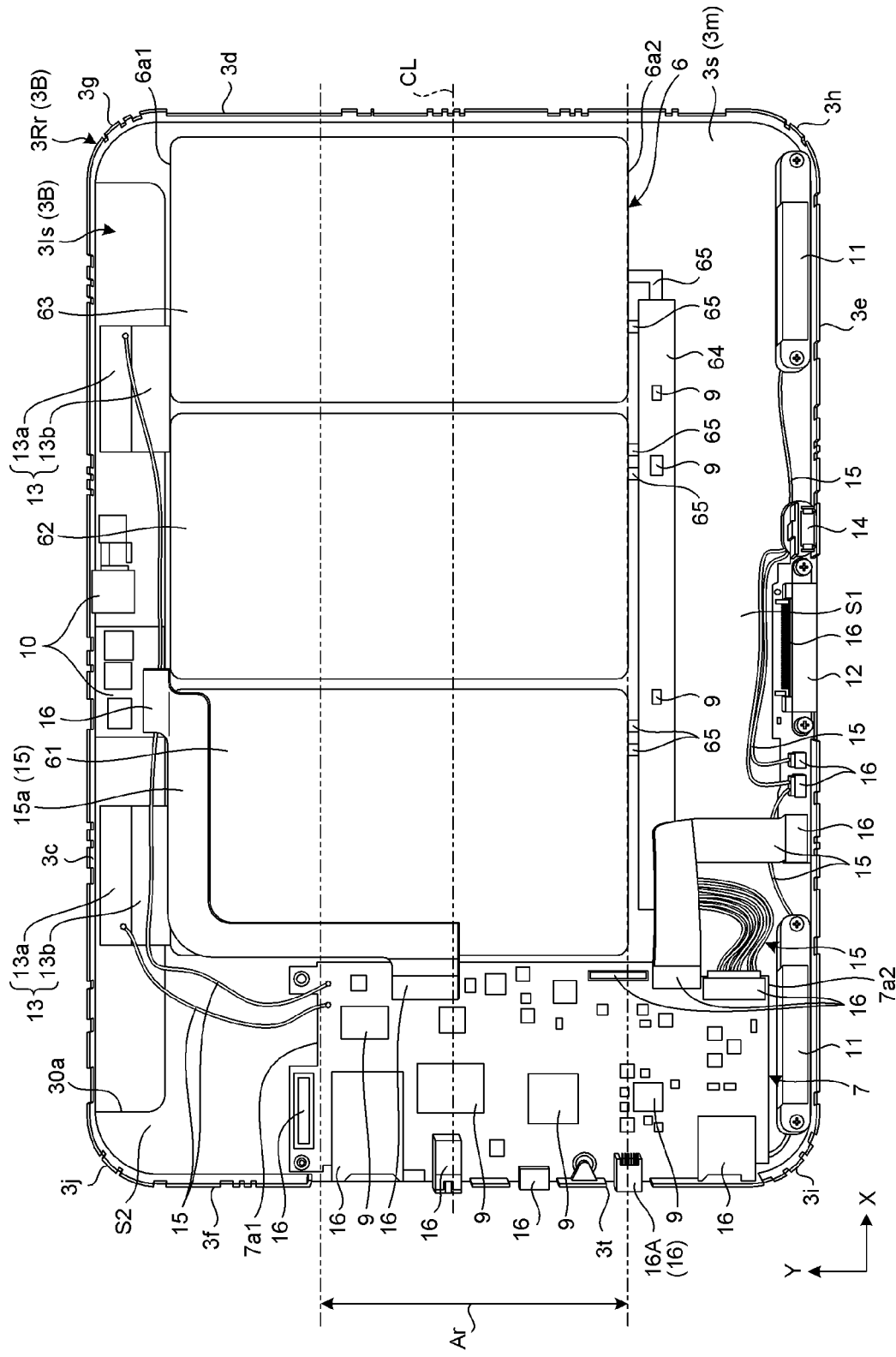
FIG. 22 is an exemplary plan view (front view) of the internal structure of the electronic device comprising a second member, in the second embodiment.
Figure 23:
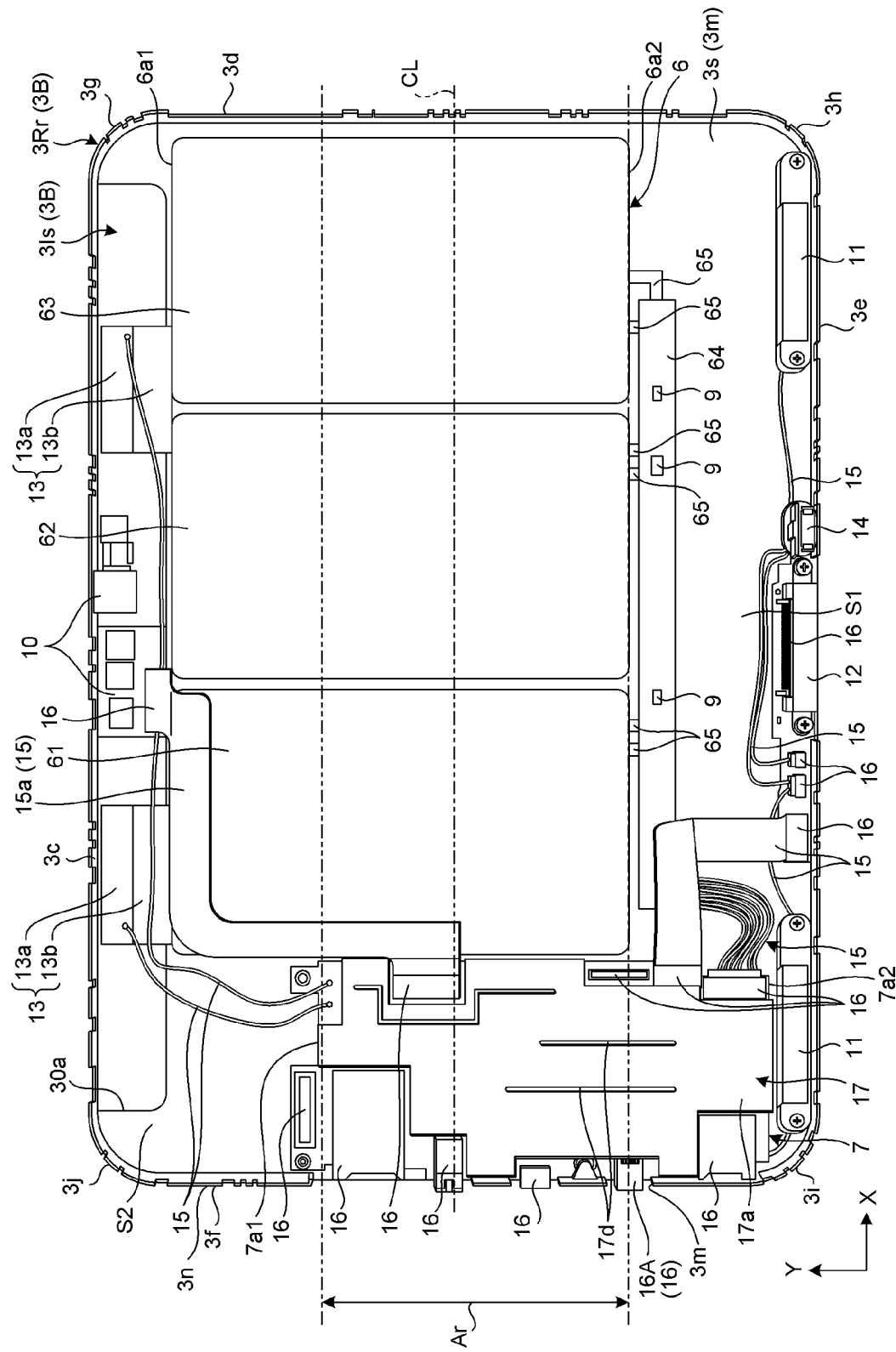
FIG. 23 is an exemplary plan view (front view) of the internal structure of the electronic device comprising the second member, with a cover provided on the circuit board, in the second embodiment.

In the second embodiment, as an example, as illustrated in FIGS. 21 to 23, as electric components, the battery 6 (a cell, an assembled battery), the circuit board 7 (a circuit board, a printed board, a control board), a camera module 10 (a camera unit, a camera assembly, an image capturing device), a speaker module 11 (a speaker unit, a speaker assembly, an audio output device), a connector module 12 (a connector unit, a connector assembly, a connector device), an antenna module 13 (an antenna unit, an antenna assembly, an antenna device), an oscillation generating module 14 (a motor having a rotating shaft to which an eccentric weight is attached), and the like are housed behind the display device 4 (on the side of the rear surface, behind side, back side, the side closer to the wall 3m, on the opposite side of the display surface 4a) in the housing 3B. These electric components are electrically connected to the other electric components via wiring 15 (e.g., a cable, a flexible cable, a flexible printed wiring board).

In the second embodiment, as an example, the battery 6 may be configured as a lithium-ion secondary battery. In the second embodiment, as an example, the battery 6 is capable of supplying power that is required for enabling the electronic device 1B to operate, e.g., display videos and output sound, to the display device 4 and electric components installed in the housing 3B via the connector 16 and the wiring 15, for example. The battery 6 is also capable of supplying power to an external device connected to the circuit board 7 and the like via the connector 16 and the wiring 15, for example.

In the second embodiment, as an example, the battery 6 comprise a plurality of cells 61, 62, and 63 as illustrated in FIGS. 22 and 23. The cells 61, 62, and 63 are arranged side by side along the end 3c. In the second embodiment, as an example, the battery 6 comprises a circuit board 64. Electrodes 65 of the respective cells 61, 62, and 63 are connected (joined) to the circuit board 64 (conductor pattern of the circuit board 64), and in this manner, the cells 61, 62, and 63 are integrated. Because the cells 61, 62, and 63 are integrated, production labors and costs can be reduced compared with a structure in which the cells 61, 62, and 63 are individually assembled. The circuit board 64 comprises a bus bar (a conductor) that electrically connects the circuit board 7 to each of the cells 61, 62, and 63, or between the cells 61, 62, and 63, as an example. The components 9 are provided (implemented) to the circuit board 64. The components 9 and the conductor pattern (wiring pattern not illustrated) on the circuit board 64 together form an electric circuit (an electronic circuit) that realizes a function of monitoring an output power (voltage), temperature, and the like of each of the cells 61, 62, and 63 or the battery 6, as an example.

In the second embodiment, as an example, the components 9 such as a CPU, a graphic controller, power circuit components, a platform controller hub (PCH), a memory slot connector, a LCD connector, an input/output (I/O) connector, a power coil, an element, a connector, and the like can be implemented on the circuit board 7. The components 9 include heating elements. A cooling mechanism 17 (a cooling mechanism) may be provided to the circuit board 7 (the components 9 on the circuit board 7).

In the second embodiment, as an example, the circuit board 7 and the components 9 form at least a part of a controlling circuit (not illustrated). The controlling circuit may include a video signal processing circuit, a tuner, an HDMI signal processor, an AV input terminal, a remote controller signal receiver, a controller, a selector, an on-screen display, a storage (e.g., a ROM, a RAM, an HDD), an audio signal processing circuit, and the like. The controlling circuit controls video outputs (e.g., moving images or still images) from the display surface 4a of the display device 4, sound outputs from a speaker (not illustrated), and light emissions from a light emitting diode (LED) (not illustrated). The display device 4, the speaker, the LED, and the like are examples of an output module.

In the second embodiment, as an example, as illustrated FIGS. 21 to 23, the battery 6 and the circuit board 7 do not overlap each other in the thickness direction of the housing 3B (Z direction), but they are instead laid along an internal surface 3s (a first surface) of the wall 3m in the housing. Therefore, the housing 3B can be configured thinner, compared with a structure in which the battery 6 and the circuit board 7 are overlapped each other in the thickness direction. In the second embodiment as well, the surface (a second surface, not illustrated) of the battery 6 facing the surface 3s of the wall 3m and the surface (a second surface, not illustrated) of the circuit board 7 are adhered (attached), at least partially, to the surface 3s using an adhesive agent, a double-sided adhesive tape, or the like, in the same manner as in the first embodiment. Therefore, in the second embodiment as well, the same advantageous effects of the first embodiment achieved because the electric components such as the battery 6 and the circuit board 7 are adhered to the wall 3m of the housing 3B can also be achieved.

Furthermore, as an example, on both sides of the center (the central line CL; see FIGS. 22 and 23) of the wall 3m, the surface of the battery 6 and the surface of the circuit board 7 facing surface 3s are adhered to the wall 3m. Preferably, relatively wide areas of these surfaces, and more preferably, from an end 6a1 of the surface of the battery 6 and an end 7a1 of the surface of the circuit board 7 facing surface 3s on the side of the end 3c to an end 6a2 and an end 7a2 on the side of the end 3e are adhered to the wall 3m.

Therefore as an example, the wall 3m can be suppressed from being bent locally. Furthermore, in the second embodiment, as an example, the battery 6 is positioned closer to the end 3c (a second end), and the circuit board 7 is positioned closer to the end 3e (a first end). Therefore, as an example, a wider area of the wall 3m between the end 3c and the end 3e can be reinforced. Furthermore, as an example, an area S1 between the battery 6 and the end 3e and an area S2 between the circuit board 7 and the end 3c may be utilized better for laying other circuit boards (e.g., a driver circuit board 4c for the display device 4; see FIG. 21) or the wiring 15. Furthermore, in the second embodiment, as an example, the battery 6 and the circuit board 7 are arranged in a manner interspaced from the end 3c and the end 3e. Therefore, according to the second embodiment, as an example, the ends 3c and 3e where a hand or a finger can easily touch can be prevented from being heated by the heat generated by the battery 6 or the circuit board 7. Moreover, as may be obvious from FIG. 22, in the second embodiment, as an example, an area Ar to which the electric components are adhered is laid at the central part of the wall 3m including the central line CL, from one side (the side of the end 3d) to the other side (the side of the end 3f) of a direction laid along the ends 3c and 3e. Therefore, according to the second embodiment, as an example, the stiffness and the strength of the wall 3m of the second member 3Rr, and the stiffness and the strength of the housing 3B in turn, can be improved.

In the second embodiment, as an example, as illustrated in FIG. 22, a U-shaped cutout 30a is formed on the end 3c of the second member 3Rr. A third member 3Is made of a low-conductive material (a non-conductive material, an insulating material; e.g., a synthetic resin material) is attached to the cutout 30a. The third member 3Is is coupled to the cutout 30a on the wall 3m of the second member 3Rr by heat welding, for example.

In the second embodiment, as an example, as illustrated in FIG. 22, the antenna module 13 and the camera module 10 are attached to the third member 3Is made of a low-conductive material. In such a structure, because the conductive material functions as an electromagnetic shield, communications performed via the antenna module 13 can be prevented from being affected. On the side of the rear surface 3b, a cover (a plate) 10a is arranged as illustrated in FIG. 20, and a lens 10b and a light 10c of the camera module 10 are exposed through the cover 10a.

In the second embodiment, as an example, as illustrated in FIG. 22, the antenna module 13 comprises a communication module 13a and a grounding module 13b. A portion of the grounding module 13b is held between the battery 6 and the wall 3m of the second member 3Rr. By electrically connecting the grounding module 13b to the wall 3m, the electric potential of the wall 3m can be brought closer to the ground level (electric potential) of the grounding module 13b more easily. Therefore, the grounding module 13b can reduce noise introduced to the antenna module 13. In addition, the electric potential of the covering of the battery 6 can be brought closer to the ground level (electric potential) of the grounding module 13b in the antenna module 13 more easily.

In the second embodiment, as an example, as illustrated in FIG. 22, wiring 15a (15) electrically connected to the camera module 10 is configured as a flexible printed wiring board, and is laid over the battery 6 in the thickness direction of the housing 3B. Therefore, according to the second embodiment, as an example, the wiring 15a functions as an electromagnetic shield and can suppress communications performed via the antenna module 13 from being affected.

Furthermore, in the second embodiment, as an example, as illustrated in FIG. 22, the wiring 15a is laid along the edge of the battery 6. Therefore, according to the second embodiment, the wiring 15a can be laid at a position offset from the center of the battery 6 where temperature could be high, as an example.

In the second embodiment, as an example, as illustrated in FIGS. 22 and 23, the first connector 16A is installed on the circuit board 7. The first connector 16A is implemented on an edge (end, side) of the circuit board 7. The first connector 16A is implemented side by side with other connectors 16 on the circuit board 7. The first connector 16A is also arranged along an edge of the cooling mechanism 17 (FIG. 23). The first connector 16A is exposed through an opening 3t provided to the walls 3n.

The electronic device 1B according to the second embodiment can also achieve the same advantageous effects as those achieved by having a structure that is similar to that of the television receiver 1A according to the first embodiment.

Figure 24:
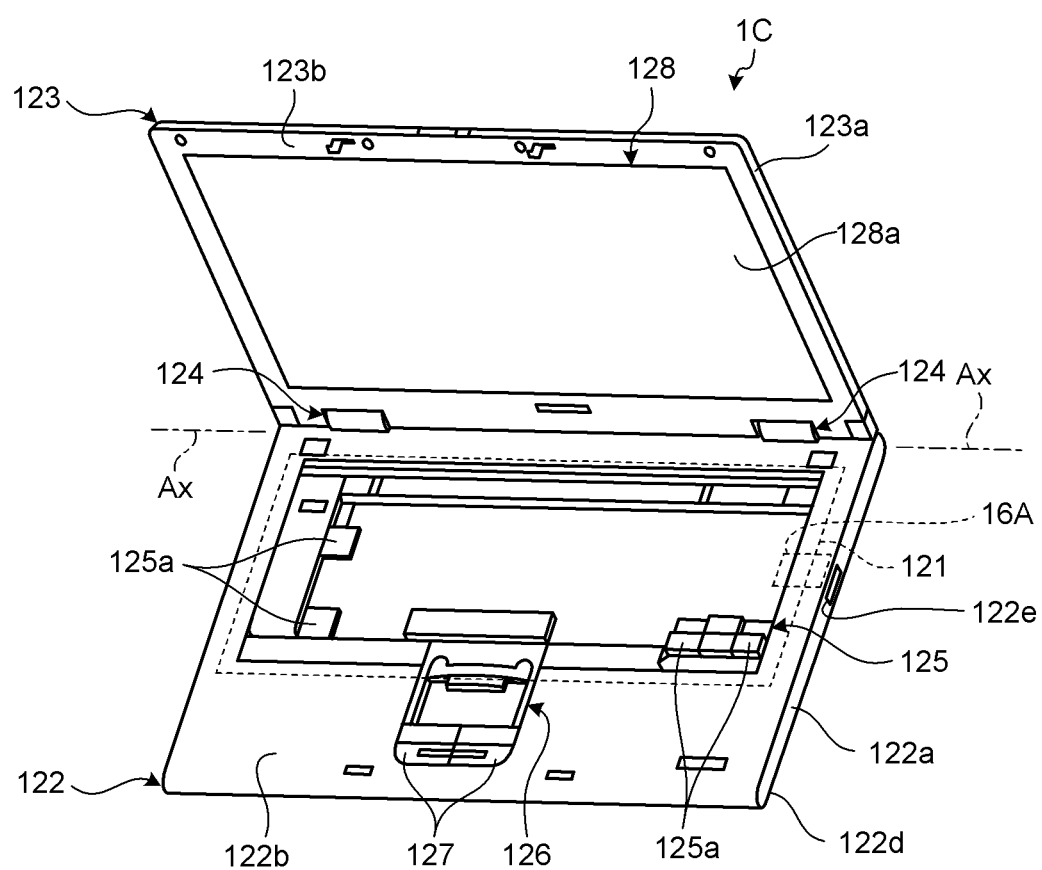
FIG. 24 is an exemplary perspective view of an electronic device according to a third embodiment.

An electronic device 1C according to a third embodiment illustrated in FIG. 24 is configured as a so-called laptop personal computer. The electronic device 1C comprises a first main body 122 having a flat and rectangular shape and a second main body 123 having a flat and rectangular shape. The first main body 122 and the second main body 123 are connected via a hinge mechanism 124, in a manner rotatable with respect to each other about a rotation axis Ax between an opened configuration illustrated FIG. 24 and a folded configuration not illustrated.

On the first main body 122, a keyboard 125, a pointing device 126, a click button 127, and the like as input operation modules are arranged in a manner exposed from a front surface 122b that is an external surface of a housing 122a. To the second main body 123, a display 128 as a display device (a component) is provided in a manner exposed from a front surface 123b that is an external surface of a housing 123a. The display 128 is configured as an LCD, for example. While the electronic device 1C is opened, the keyboard 125, the pointing device 126, the click button 127, a display surface 128a of the display 128, and the like are exposed so that the user can use. While the electronic device 1C is folded, the front surface 122b and the front surface 123b closely face each other, and the keyboard 125, the pointing device 126, the click button 127, the display 128, and the like are hidden by the housing 122a and the housing 123a. In FIG. 24, only some of keys 125a of the keyboard 125 are illustrated.

A circuit board 121 that is similar to the circuit board 7 described in the first embodiment is housed in the housing 122a of the first main body 122 or the housing 123a of the second main body 123 (in the third embodiment, only in the housing 122a). On the circuit board 121, the first connector 16A is implemented. The first connector 16A is exposed through an opening (a second opening) 122e formed on a side wall 122d of the housing 122a.

The display 128 receives a display signal from a controlling circuit comprising a CPU 104 implemented on the circuit board 121, and displays an image such as a still image or a moving image. The controlling circuit in the electronic device 1C also comprises storages (e.g., a ROM, a RAM, and an HDD), interface circuits, and various controllers, in addition to the CPU 104. A speaker (not illustrated) and the like for outputting sound is also internalized in the electronic device 1C.

The electronic device 1C according to the third embodiment can also achieve the same advantageous effects as those achieved by having a structure that is similar to that of the television receiver 1A according to the first embodiment.

Figure 25:
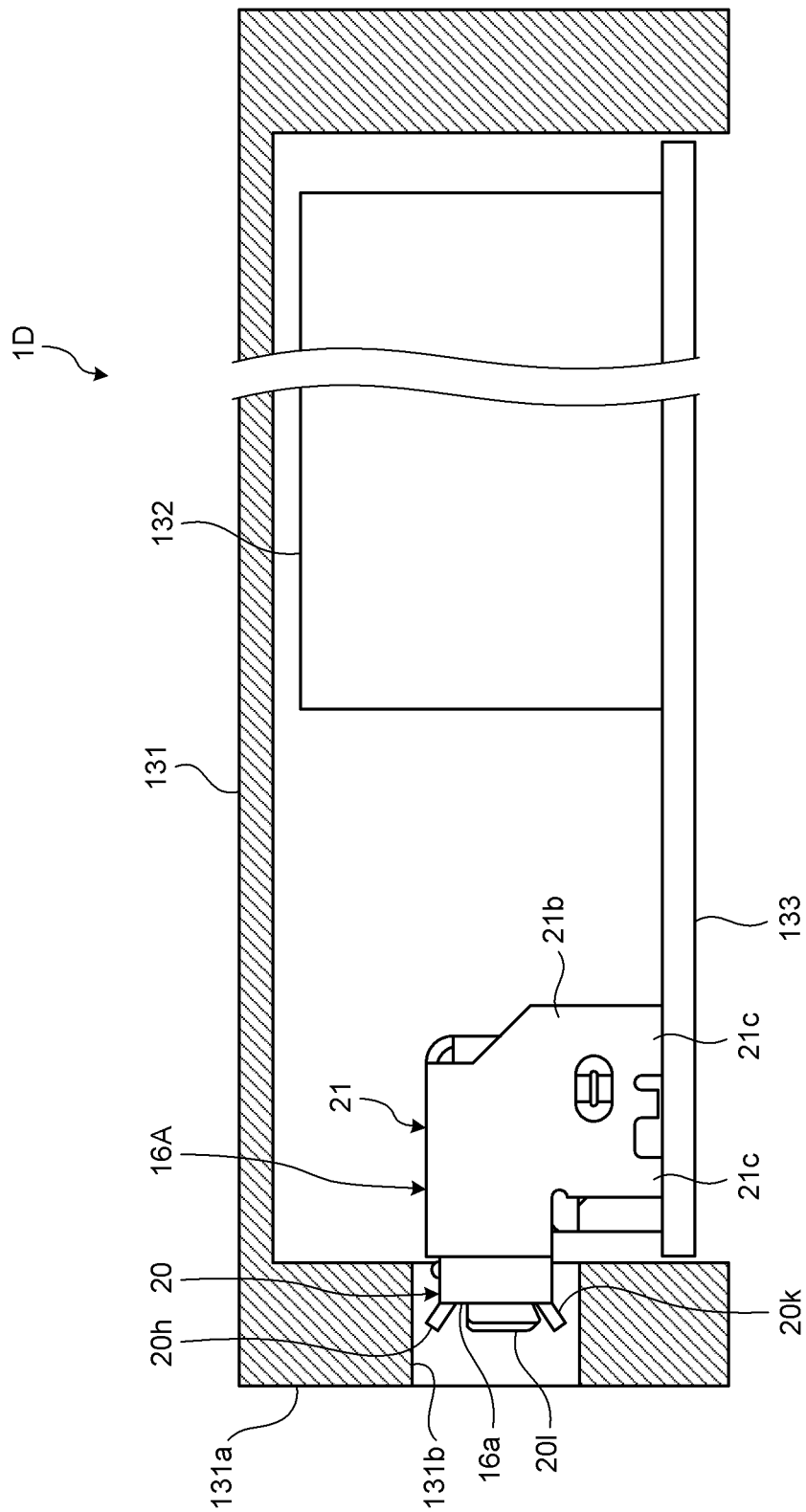
FIG. 25 is an exemplary cross-sectional view of an electronic device according to a fourth embodiment.

An electronic device 1D according to a fourth embodiment illustrated in FIG. 25 is configured as a magnetic disk device. The electronic device 1D comprises a housing 131, a magnetic disk reading and writing mechanism 132 housed in the housing 131, and a circuit board 133 mounted on the housing 131 using fasteners such as screws. The magnetic disk reading and writing mechanism 132 comprises a magnetic disk (not illustrated). The first connector 16A is implemented on the circuit board 133, and is exposed through an opening 131b formed on a side wall 131a of the housing 131.

The electronic device 1D according to the embodiment can also achieve the same advantageous effects as those achieved by having a structure that is similar to that of the television receiver 1A according to the first embodiment.

Figure 26:
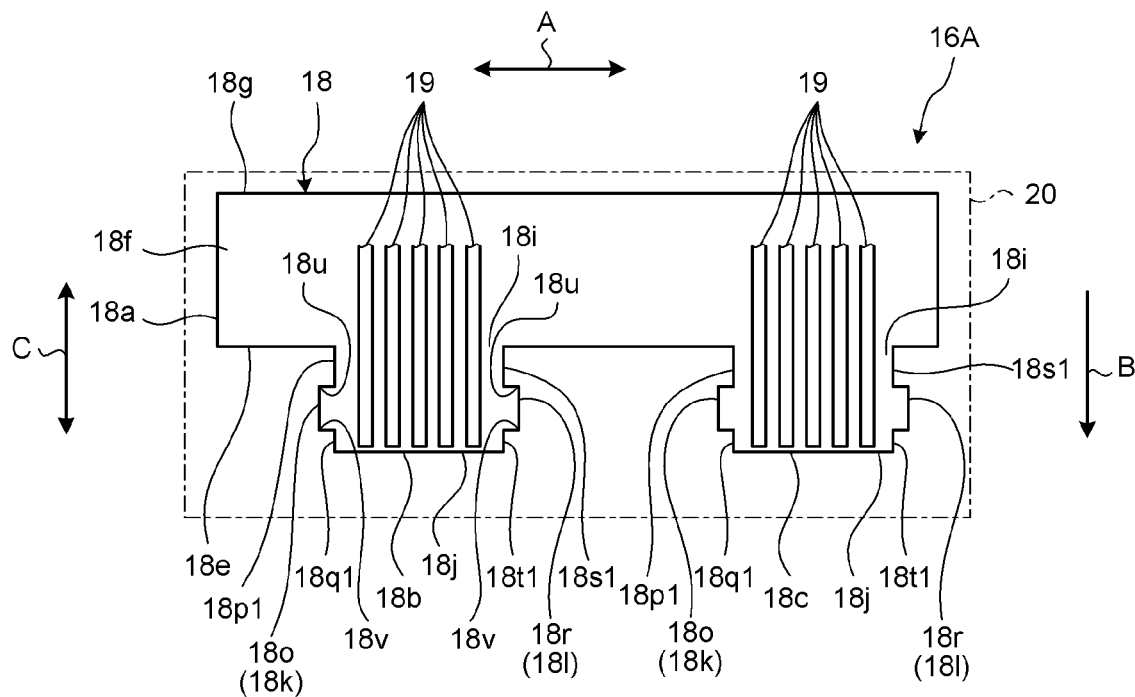
FIG. 26 is an exemplary schematic diagram of a connector according to a fifth embodiment.

In a fifth embodiment, the first connector 16A is partly different from the first connector 16A according to the embodiments described above. As illustrated in FIG. 26, in the first connector 16A according to the fifth embodiment, depressed portions (recessed portions, stepped portions, recesses) 18p1, 18q1, 18s1, and 18t1 are formed on the sides 18k and 18l of the insertion portions 18b and 18c, instead of the slanted surfaces 18p, 18q, 18s, and 18t. In other words, each of the insertion portions 18b and 18c according to the fifth embodiment comprises the side surfaces 18o and 18r, and portions (depressed portions 18p1, 18q1, 18s1, and 18t1) depressed into the side surfaces 18o and 18r on at least one of the one end 18u of each of the side surfaces 18o and 18r located closer to the base portion 18a and the other end 18v located opposite the one end 18u. The depressed portions 18p1, 18q1, 18s1, and 18t1 are examples of a portion comprising a step portion with respect to a portion (the side surface 18o or 18r) extending along the direction in which the external connector is inserted into or removed (the direction along the arrow C in FIG. 26).

In the fifth embodiment, when the external connector 23 is removed by being moved diagonally with respect to the direction in which the insertion portions 18b and 18c of the first connector 16A extend, the depressed portions 18p1, 18q1, 18s1, and 18t1 permit such a diagonal movement of the external connector 23. Therefore, even if the external connector 23 is removed by being moved diagonally with respect to the direction in which the insertion portions 18b and 18c of the first connector 16A extend, the external connector 23 can be suppressed from pressing the insertion portions 18b and 18c in the direction bending the insertion portions 18b and 18c. Hence, concentration of stress on the insertion portions 18b and 18c can be suppressed, and therefore, the insertion portions 18b and 18c can be suppressed from being damaged.

Figure 27:
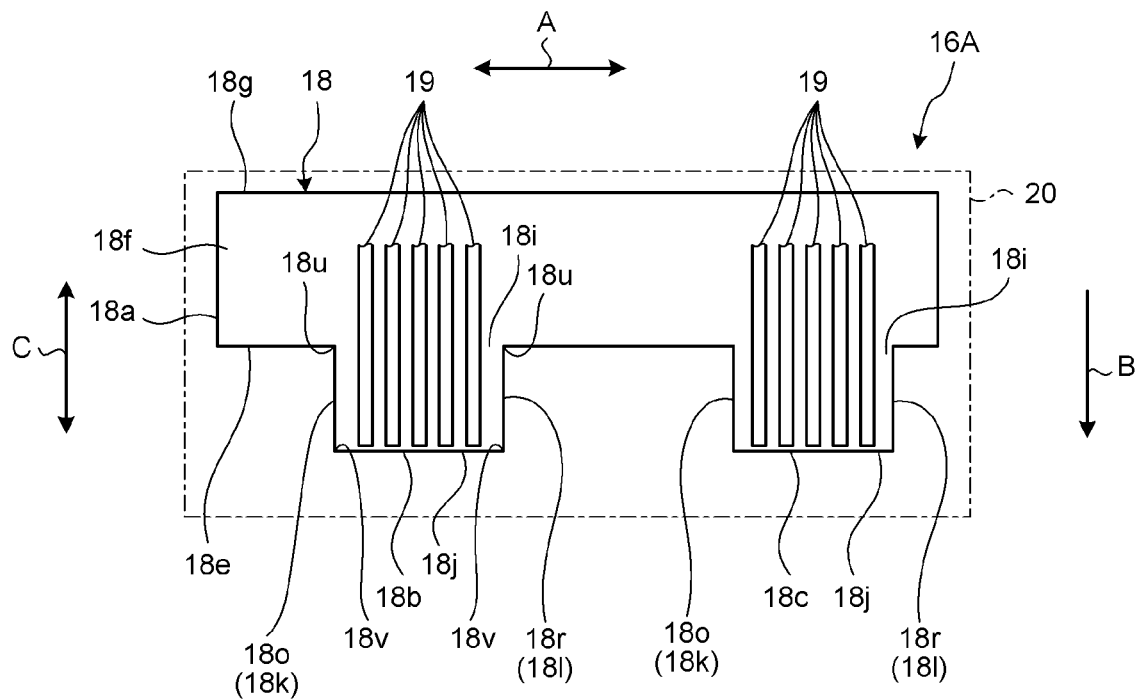
FIG. 27 is an exemplary schematic diagram of a connector according to a sixth embodiment.

In a sixth embodiment, the first connector 16A is partly different from the first connector 16A according to the embodiments described above. As illustrated in FIG. 27, the first connector 16A according to the sixth embodiment does not comprise the slanted surfaces 18p, 18q, 18s, and 18t or the depressed portions 18p1, 18q1, 18s1, and 18t1 on the sides 18k and 18l. In other words, the side surfaces 18o and 18r are provided over the entire surfaces of the respective sides 18k and 18l. In the sixth embodiment, the widths of the insertion portions 18b and 18c (the width in the direction along the arrow A in FIG. 27) are smaller than the widths of the respective fitting portions 23a and 23b of the external connector 23 with which the insertion portions 18b and 18c are fitted (connected, coupled, joined). In an arrangement in which the insertion portions 18b and 18c are fitted to the respective fitting portions 16a and 16b, a gap (a space, a play) is provided between the internal surface of each of the insertion portions 18b and 18c and the internal surface of corresponding one of the fitting portions 16a and 16b in the width direction of the insertion portions 18b and 18c (the direction along the arrow A in FIG. 27). In other words, a room is left between the first connector 16A and the external connector that are connected to each other, in the width direction of the first connector 16A (the direction along the arrow A in FIG. 27).

In the sixth embodiment, because a gap (a space, a room) is provided between the internal surface of each of the insertion portions 18b and 18c and the internal surface of corresponding one of the fitting portions 16a and 16b, when the external connector 23 is removed by being moved diagonally with respect to the direction in which the insertion portions 18b and 18c of the first connector 16A extend, such a diagonal movement of the external connector 23 is permitted. Therefore, even if the external connector 23 is removed by being moved diagonally with respect to the direction in which the insertion portions 18b and 18c of the first connector 16A extend, the external connector 23 can be suppressed from pressing the insertion portions 18b and 18c in the direction bending the insertion portions 18b and 18c. Hence, concentration of stress on the insertion portions 18b and 18c can be suppressed, and therefore, the insertion portions 18b and 18c can be suppressed from being damaged.

Figure 28:
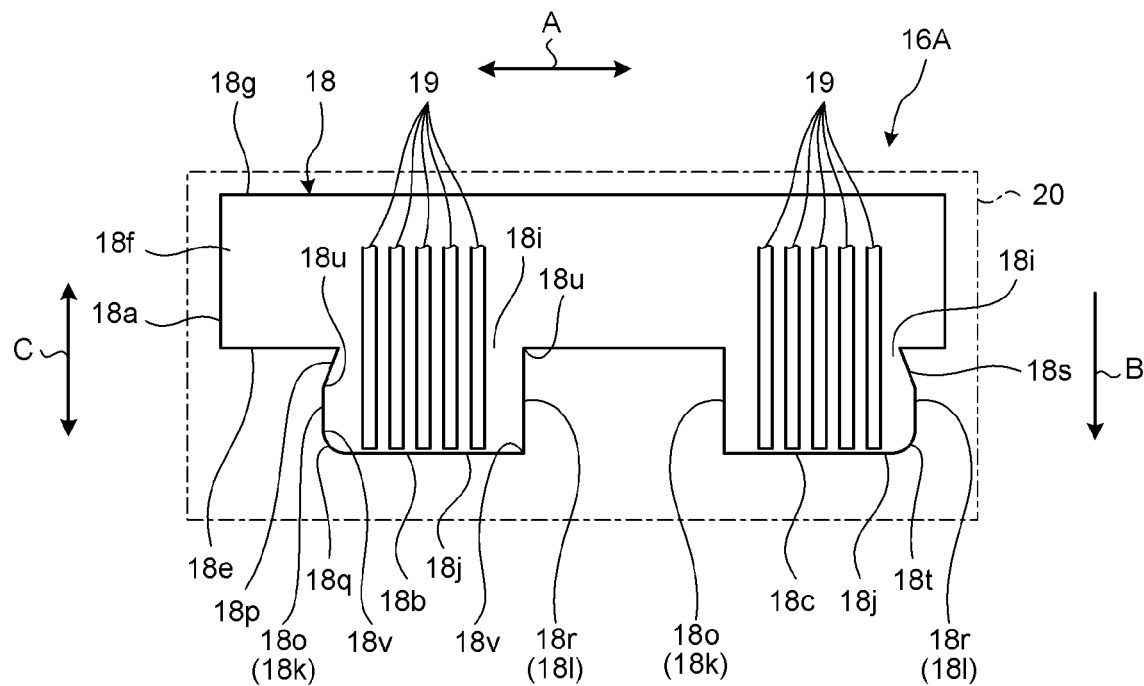
FIG. 28 is an exemplary schematic diagram of a connector according to a seventh embodiment.

In a seventh embodiment, the first connector 16A is partly different from the first connector 16A according to the embodiments described above. As illustrated in FIG. 28, in the first connector 16A according to the seventh embodiment, the slanted surfaces 18s and 18t are not provided on the side 18l of the insertion portion 18b, and the side surface 18r is provided over the entire side 18l. Furthermore, the slanted surfaces 18p and 18q are not provided on the side 18k of the insertion portion 18c, and the side surface 18o is provided over the entire side 18k.

In such a configuration as well, when the external connector 23 is removed by being moved diagonally with respect to the direction in which the insertion portions 18b and 18c of the first connector 16A extend, the slanted surfaces 18p, 18q, 18s, and 18t permit the diagonal movement of the external connector 23. Therefore, even if the external connector 23 is removed by being moved diagonally with respect to the direction in which the insertion portions 18b and 18c of the first connector 16A extend, the external connector 23 can be suppressed from pressing the insertion portions 18b and 18c in the direction bending the insertion portions 18b and 18c. Hence, concentration of stress on the insertion portions 18b and 18c can be suppressed, and therefore, the insertion portions 18b and 18c can be suppressed from being damaged.

Instead of the slanted surfaces 18p, 18q, 18s, and 18t, the depressed portions 18p1, 18q1, 18s1, and 18t1 may be provided. As long as at least one of the slanted surfaces 18p, 18q, 18s, and 18t or the depressed portions 18p1, 18q1, 18s1, and 18t1 is provided on the insertion portions 18b and 18c, concentration of stress on the insertion portions 18b and 18c can be suppressed, and therefore, the insertion portions 18b and 18c can be suppressed from being damaged.

Figure 29:
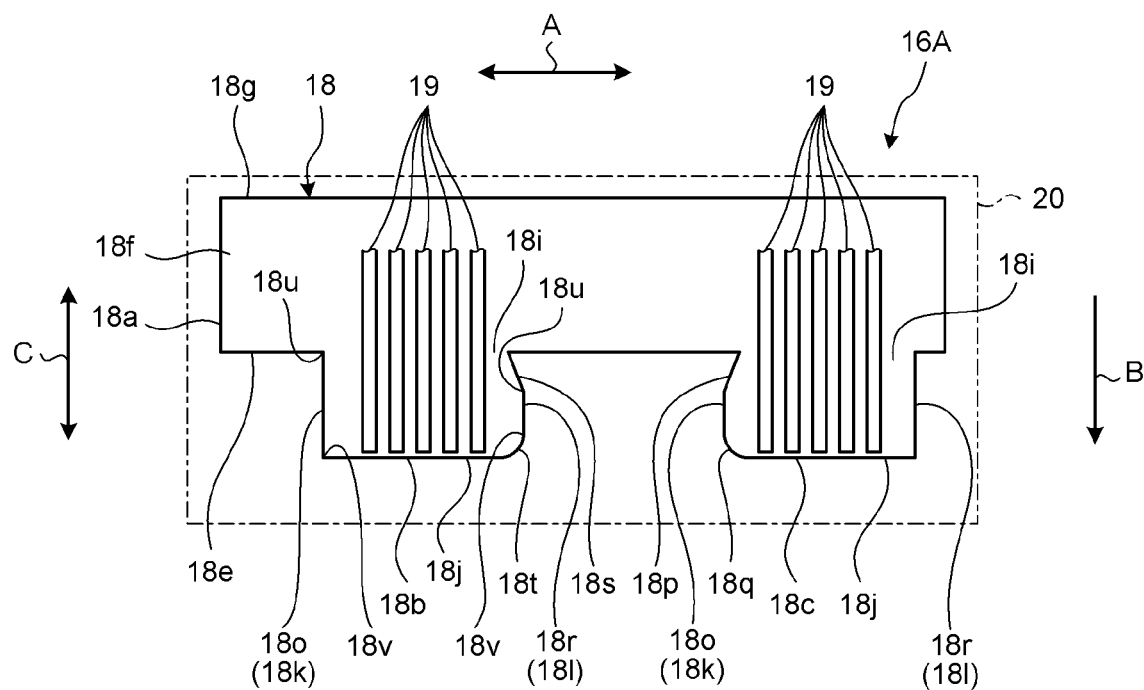
FIG. 29 is an exemplary schematic diagram of a connector according to a modification of the seventh embodiment.

A modification of the seventh embodiment will now be explained. As illustrated in FIG. 29, in the first connector 16A according to the modification, the slanted surfaces 18p and 18q are not provided on the side 18k of the insertion portions 18b, and the side surface 18o is provided over the entire side 18k. The slanted surfaces 18s and 18t are not provided on the side 18*l* of the insertion portion 18*c*, and the side surface 18*r* is provided over the entire side 18*l*.

In an eighth embodiment, the shape of the opening 3*t* on the housing 3A is different from that in the first embodiment. The eighth embodiment may be applied to the embodiments other than the first embodiment.

Figure 30:
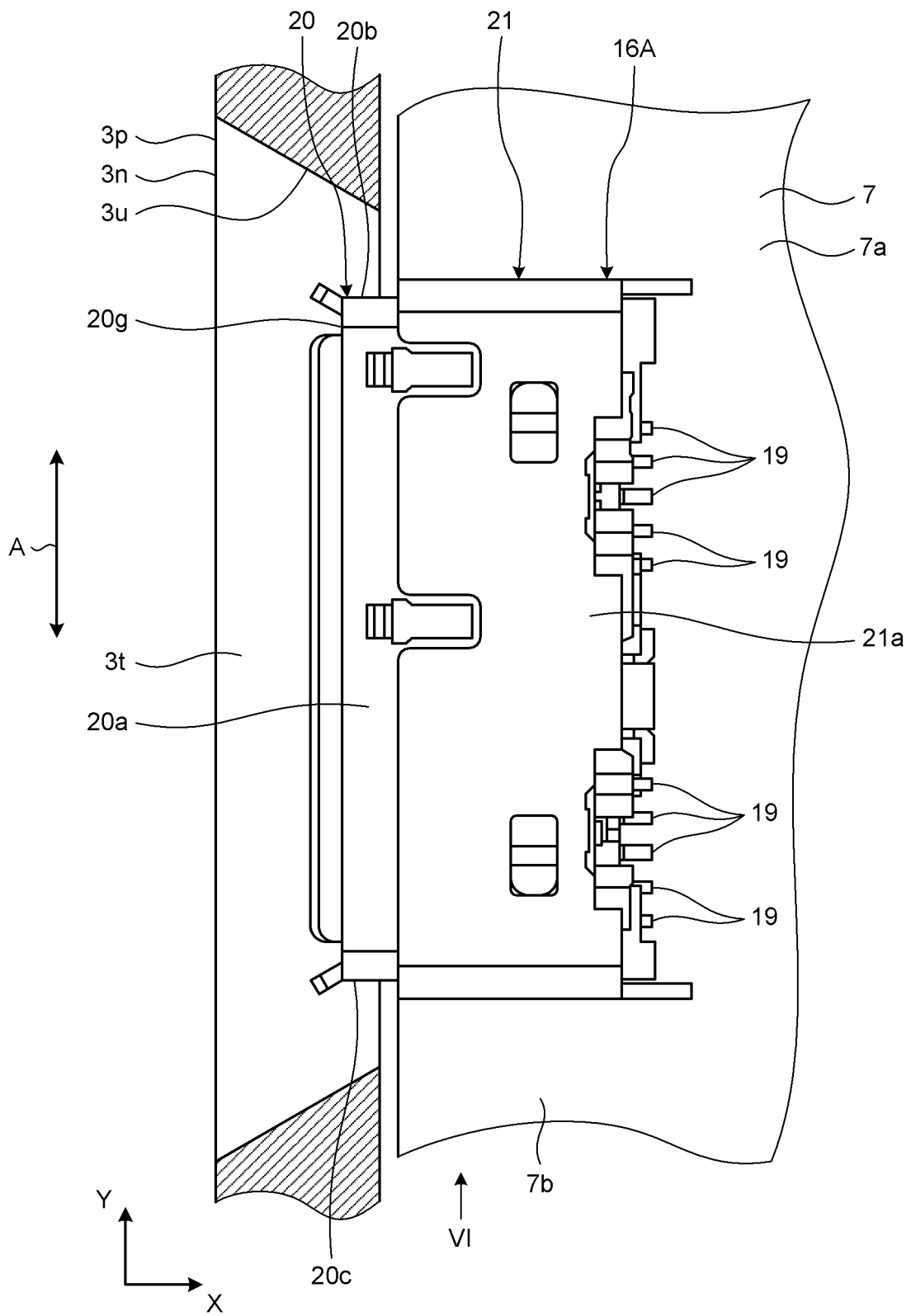
FIG. 30 is an exemplary cross-sectional view illustrating peripherals of a connector according to an eighth embodiment.

The circumference of the opening 3*t* according to the eighth embodiment is increased from inside toward outside of the housing 3A. In other words, the opening 3*t* has a sectional area (the sectional area along the arrow Y in FIG. 30) increasing in size in a direction from the inside toward the outside of the housing 3A. In other words, the size of opening surrounded by a circumferential surface 3*u* of the opening 3*t* is increased from the inside toward the outside of the housing 3A.

In such a structure, when the external connector 23 is removed by being moved diagonally with respect to the direction in which the insertion portions 18*b* and 18*c* of the first connector 16A extend, the opening 3*t* permits the diagonal movement of the external connector 23 more. Hence, concentration of stress on the insertion portions 18*b* and 18*c* can be suppressed, and therefore, the insertion portions 18*b* and 18*c* can be suppressed from being damaged. In this structure, it is preferable for the insertion portions 18*b* and 18*c* to comprise the slanted surfaces 18*p*, 18*q*, 18*s*, and 18*t* or the depressed portions 18*p*1, 18*q*1, 18*s*1, and 18*t*1; however, the slanted surfaces 18*p*, 18*q*, 18*s*, and 18*t* or the depressed portions 18*p*1, 18*q*1, 18*s*1, and 18*t*1 may not be provided.

Figure 31:
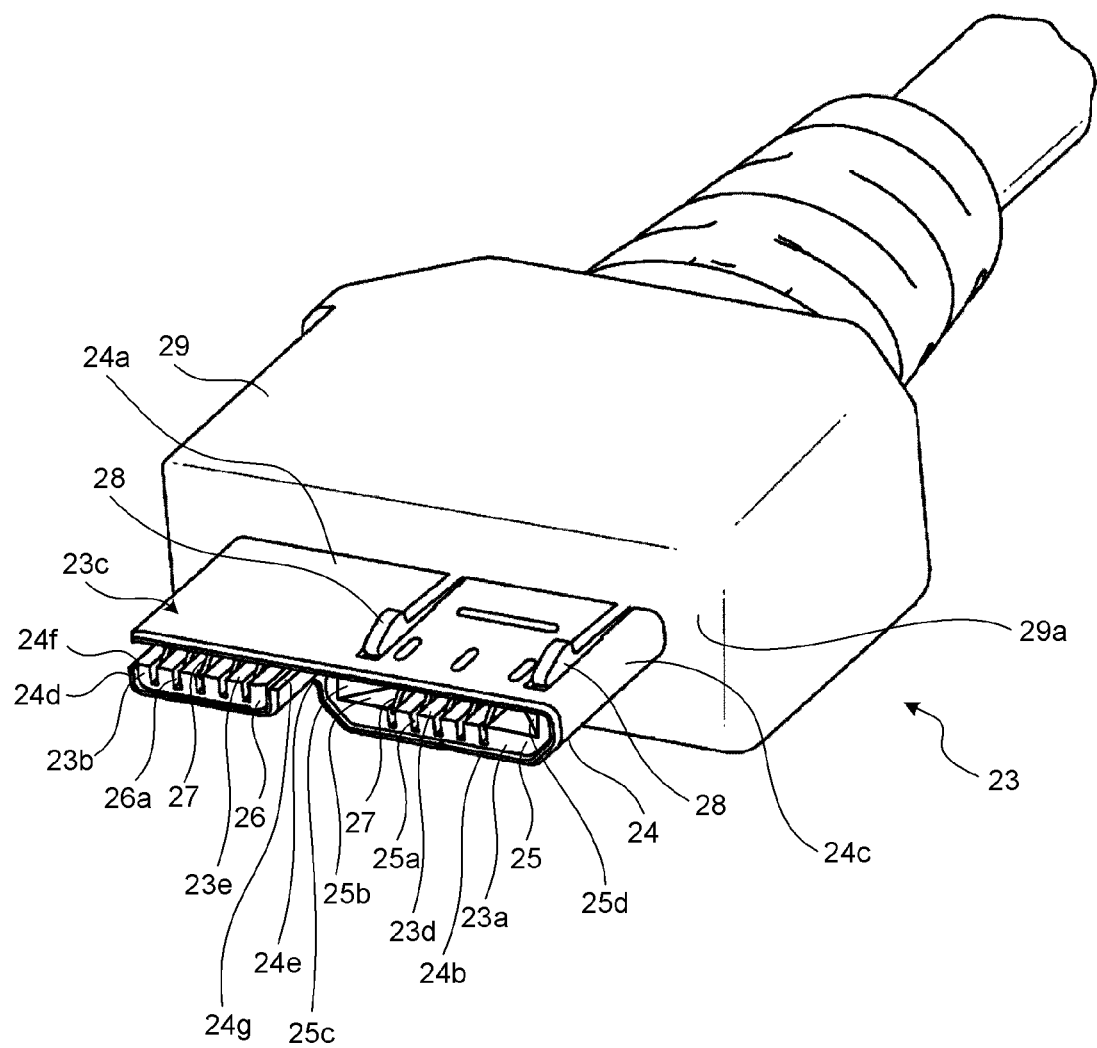
FIG. 31 is an exemplary perspective view of an external connector according to a ninth embodiment.

In a ninth embodiment, the shape of the external connector 23 is different from those according to the embodiments described above. As illustrated in FIG. 31, the external connector 23 according to the ninth embodiment, a pair of slanted surfaces 25*c* and 25*d* are provided, respectively, on a pair of the side surfaces of the recessed portion 25*b* made of an insulating member 25. The slanted surfaces 25*c* and 25*d* are slanted in a manner increasing the distance between the slanted surfaces 25*c* and 25*d* from the side of the base portion 29 toward the tip of the insulating member 25. The slanted surfaces 25*c* and 25*d* increase the width of the recessed portion 25*b* toward the tip of the insulating member 25. Alternatively, only one of the slanted surfaces 25*c* and 25*d* may be formed.

In the ninth embodiment, a cutout 24*f* is provided on a side 24*d* of the shell 24, and a cutout 24*g* is provided on a portion of the side 24*d* of the protrusion 24*e*. Alternatively, only one of the cutouts 24*f* and 24*g* may be provided.

In such a structure as well, when the external connector 23 is removed by being moved diagonally with respect to the direction in which the insertion portions 18*b* and 18*c* of the first connector 16A extend, the slanted surfaces 25*c* and 25*d* and the cutouts 24*f* and 24*g* permit such a diagonal movement of the external connector 23. Therefore, even if the external connector 23 is removed by being moved diagonally with respect to the direction in which the insertion portions 18*b* and 18*c* of the first connector 16A extend, the external connector 23 can be suppressed from pressing the insertion portions 18*b* and 18*c* in the direction bending the insertion portions 18*b* and 18*c*. Hence, concentration of stress on the insertion portions 18*b* and 18*c* can be suppressed, and therefore, the insertion portions 18*b* and 18*c* can be suppressed from being damaged.

A cutout may be provided at least one of the pair of side surfaces (sides) of the recessed portion 25*b*. A cutout may be provided on a side 24*c* of the shell 24 or a portion of the protrusion 24*e* on the side of the side 24*c*. Furthermore, at least one of the side 24*d* of the shell 24 and a portion of the protrusion 24*e* on the side of the side 24*c* may be slanted with respect to each other so that the distance between the side 24*d* of the shell 24 and the portion of the protrusion 24*e* on the side of the side 24*c* is increased from the base portion 29 toward the tip. In other words, by slanting the sides (walls) of the fitting portions 23*a* and 23*b* or providing cutouts to the fitting portions 23*a* and 23*b*, the diagonal movement of the external connector 23 can be permitted.

As explained above, according to each of the embodiments described above, the first connector 16A can be suppressed from being damaged.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, a connector is not limited to one comprising two insertion portions, but may also comprise only one insertion portion.

What is claimed is:

1. A television receiver comprising:
   a housing comprising a first opening and a second opening;
   a display comprising a rear surface and a display surface exposed through the first opening, the display being in the housing;
   a circuit board on the rear surface side of the display, and in the housing; and
   a connector in the housing, exposed through the second opening, configured to be coupled to the circuit board, and configured to be connected with an external connector, wherein
   the connector comprises:
      an insulating member comprising: a base portion; and an insertion portion extending from the base portion toward the second opening and configured to be inserted into a connection portion of the external connector;
      a plurality of terminal members configured to be provided to the insertion portion, and to be coupled to the connection portion; and
      a container configured to house the insertion portion, and comprises one end at which the external connector is inserted, wherein
   the insertion portion comprises: a side surface; and a slanted surface provided to at least one of ends of the side surface at the base portion side and the other one of the ends of the side surface, the slanted surface being slanted with respect to the side surface to reduce the width of the insertion portion more as the slanted surface extends further away from the side surface.

2. The television receiver of claim 1, wherein the slanted surface is configured to be provided to both of the ends of the side surface.

3. The television receiver of claim 2, wherein the slanted surface provided to the other one of the ends is configured to be shorter in a length along a direction of the insertion portion than the slanted surface provided to the one of the ends.

4. The television receiver of claim 1, wherein the slanted surface comprises a flat surface.

5. The television receiver of claim 1, wherein the slanted surface comprises a curved surface.

6. The television receiver of claim 1, wherein
the insulating member comprises two insertion portions, and
the slanted surface is provided to each of the insertion portions.

7. The television receiver of claim 1, wherein
the second opening is configured to be formed on a side wall of the housing,
the connector is configured to be provided to an end of the circuit board, and
a part including the one end of the container of the connector is configured to project out from the circuit board.

8. The television receiver of claim 1, wherein the one end of the container is in the second opening.

9. The television receiver of claim 1, wherein a part of the insertion portion is in the second opening.

10. A television receiver comprising:
a housing;
a circuit board in the housing; and
a connector in the housing, configured to be coupled to the circuit board, and configured to be connected with an external connector, wherein
the connector comprises:
an insulating member comprising: a base portion; and an insertion portion extending from the base portion and configured to be inserted into a connection portion of the external connector; and
a plurality of terminal members configured to be provided to the insertion portion, and to be coupled to the connection portion, wherein
the insertion portion comprises: a side surface; and a depressed portion provided to at least one of ends of the side surface at the base portion and the other one of the ends of the side surface, the depressed portion being depressed with respect to the side surface,
the depressed portion is configured to be provided to both of the ends of the side surface, and
the depressed portion provided to the other one of the ends is configured to be shorter in a length along a direction of the insertion portion than the depressed portion provided to the one of the ends.

11. The television receiver of claim 10, wherein the depressed portion comprises a flat surface.

12. The television receiver of claim 10, wherein the depressed portion comprises a curved surface.

13. The television receiver of claim 10, wherein
the insulating member comprises two insertion portions, and
the depressed portion is provided to each of the insertion portions.

14. An electronic device comprising:
a housing;
a circuit board in the housing; and
a connector in the housing, and configured to be coupled to the circuit board, wherein
the connector comprises: a base portion; and a surface portion extending from the base portion along a direction and brought into contact with an external connector when the connector is connected with the external connector, the direction being a direction in which the external connector is inserted and removed, and wherein
the surface portion comprises: a first portion along the direction; and a second portion comprising a step portion with respect to the first portion,
the second portion is configured to be provided to both one of ends of the first portion at the base portion side and the other one of the ends of the first portion, and
the second portion provided the other one of the ends is configured to be shorter in a length along a direction of the surface portion than the second portion provided to the one of the ends.

* * * * *